(12) United States Patent
Duda

(10) Patent No.: US 11,736,500 B2
(45) Date of Patent: Aug. 22, 2023

(54) SYSTEM AND METHOD FOR DEVICE QUARANTINE MANAGEMENT

(71) Applicant: Arista Networks, Inc., Santa Clara, CA (US)

(72) Inventor: Kenneth James Duda, Santa Clara, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 16/991,787

(22) Filed: Aug. 12, 2020

(65) Prior Publication Data

US 2022/0053007 A1    Feb. 17, 2022

(51) Int. Cl.
*H04L 9/40* (2022.01)
*H04L 43/0817* (2022.01)
*H04L 45/02* (2022.01)

(52) U.S. Cl.
CPC ...... *H04L 63/1416* (2013.01); *H04L 43/0817* (2013.01); *H04L 45/02* (2013.01); *H04L 63/145* (2013.01)

(58) Field of Classification Search
CPC ... H04L 63/1416; H04L 63/145; H04L 45/02; H04L 43/0817
See application file for complete search history.

(56) References Cited

U.S. PATENT DOCUMENTS

| | | | | |
|---|---|---|---|---|
| 8,566,946 B1* | 10/2013 | Aziz | ...... | G06F 21/56 726/25 |
| 2008/0104241 A1* | 5/2008 | Kodama | ...... | H04L 63/145 709/225 |
| 2009/0222907 A1* | 9/2009 | Guichard | ...... | H04L 63/1408 726/17 |
| 2011/0185061 A1* | 7/2011 | Chen | ...... | H04W 4/00 709/225 |
| 2011/0314542 A1* | 12/2011 | Viswanathan | ...... | G06F 21/554 726/23 |
| 2015/0373546 A1* | 12/2015 | Haugen | ...... | H04L 41/0869 726/22 |
| 2016/0014149 A1* | 1/2016 | Bradley | ...... | H04L 63/1408 726/14 |
| 2018/0041541 A1* | 2/2018 | Marsden | ...... | H04L 63/0823 |
| 2020/0044911 A1* | 2/2020 | Kliger | ...... | H04L 41/0654 |

* cited by examiner

*Primary Examiner* — Ali S Abyaneh
(74) *Attorney, Agent, or Firm* — Sprinkle IP Law Group

(57) ABSTRACT

A network manager manages a network topology. The network manager includes storage for storing a signature of a network device of the network topology. The network manager also includes a device state manager that obtains a signature of a device that participates in the network topology, the signature indicating that the device is operating in an undesired manner; makes a determination, based on signature, that the device should be in a quarantined state; in response to making the determination: generates a quarantine state update that indicates that the device is in the quarantined state; and sends, by the network manager, the quarantine state update to the device. The quarantine state update does not indicate how the quarantined state is implemented.

18 Claims, 15 Drawing Sheets

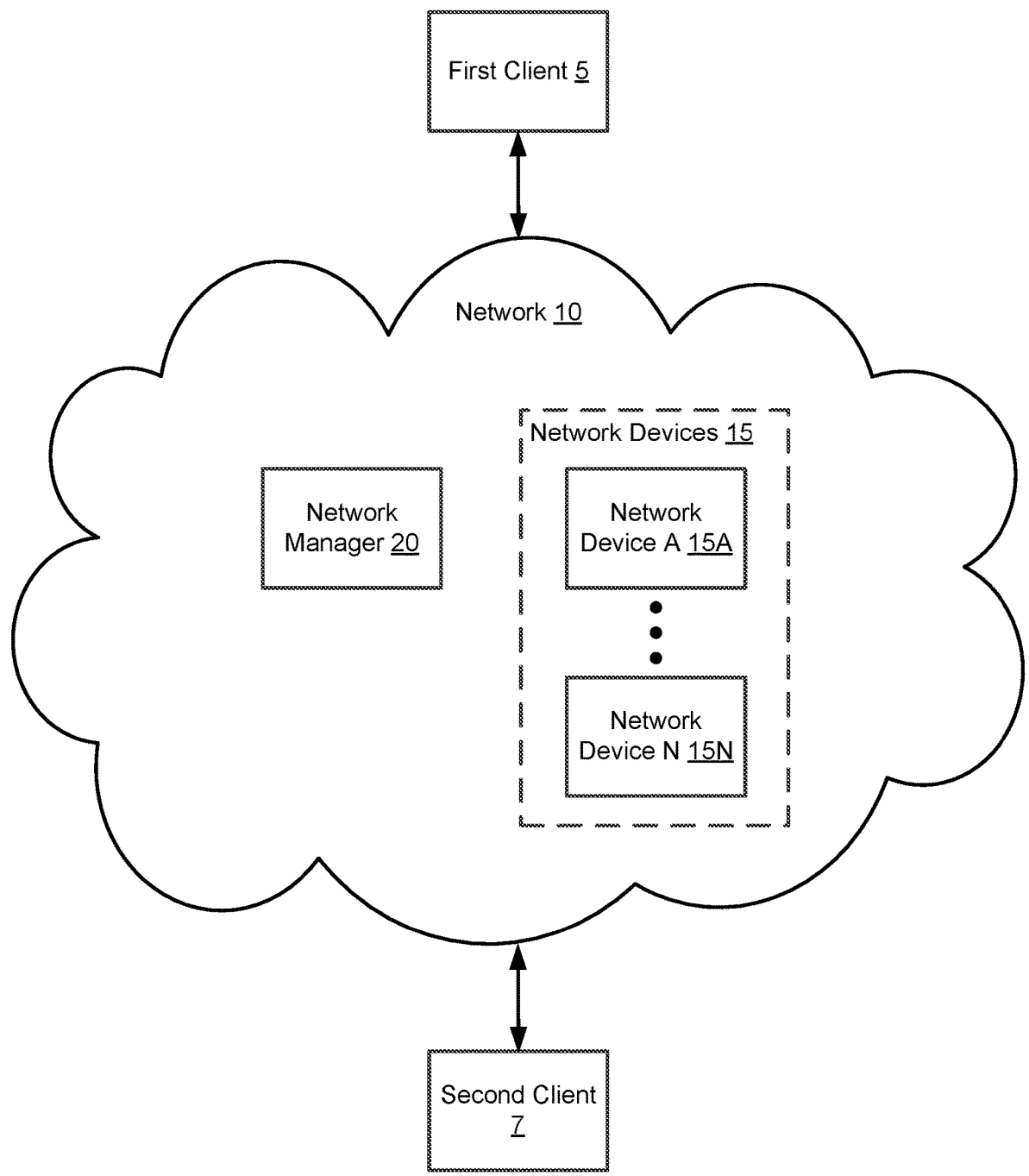
FIG. 1.1

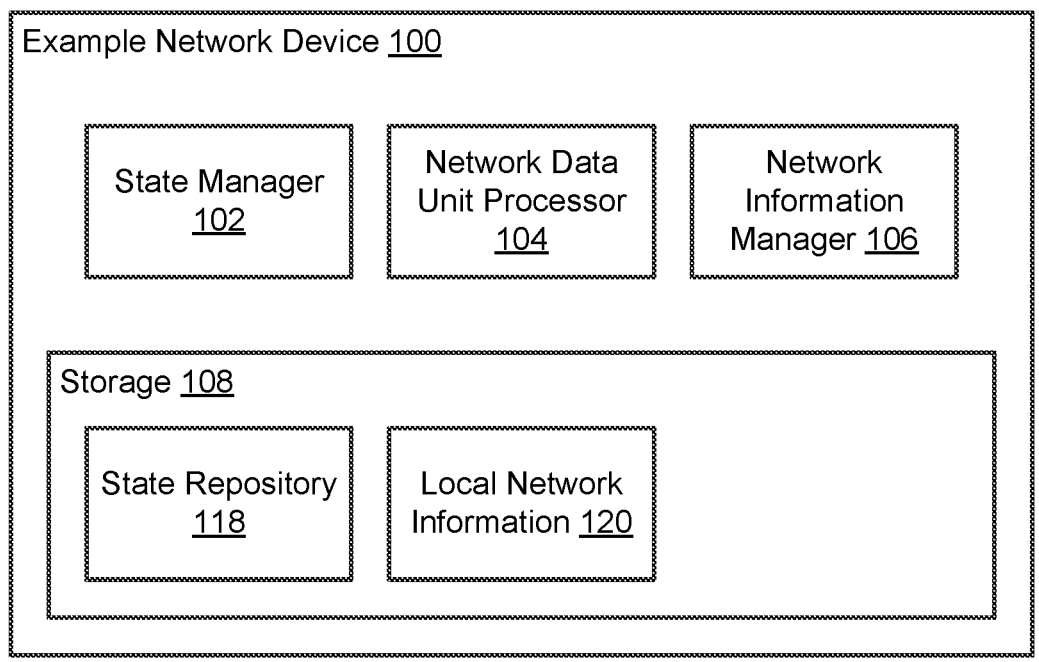
FIG. 1.2

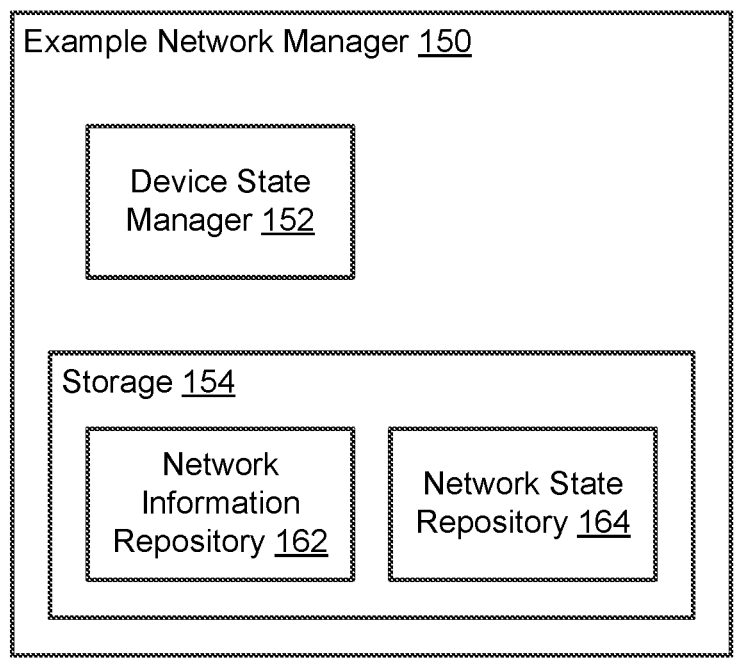
FIG. 1.3

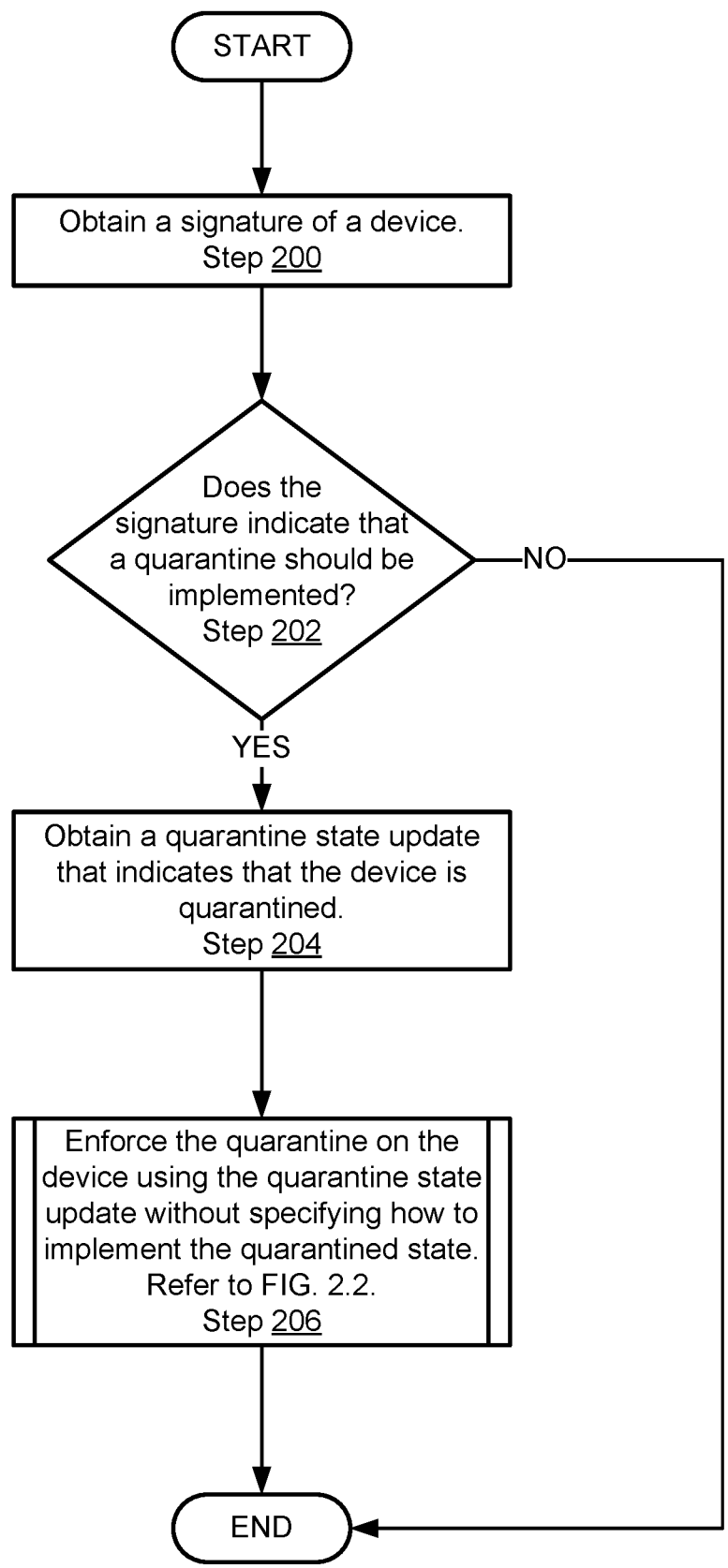
FIG. 2.1

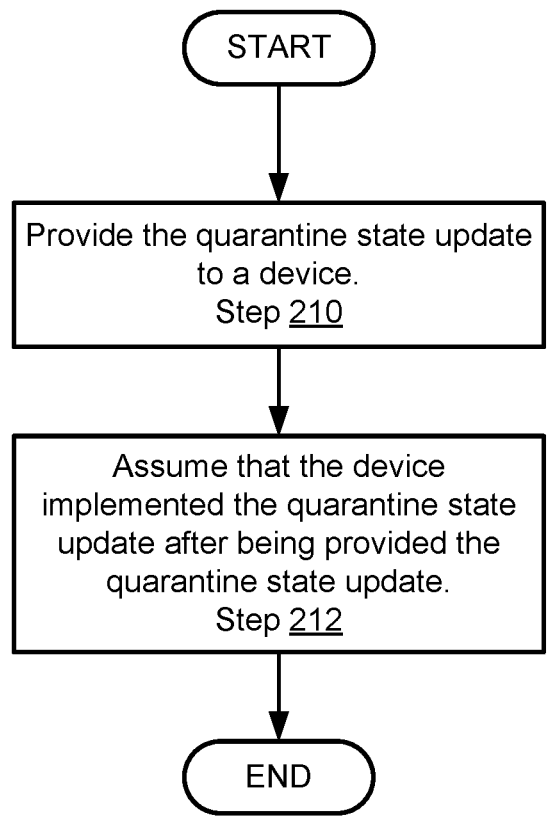
FIG. 2.2

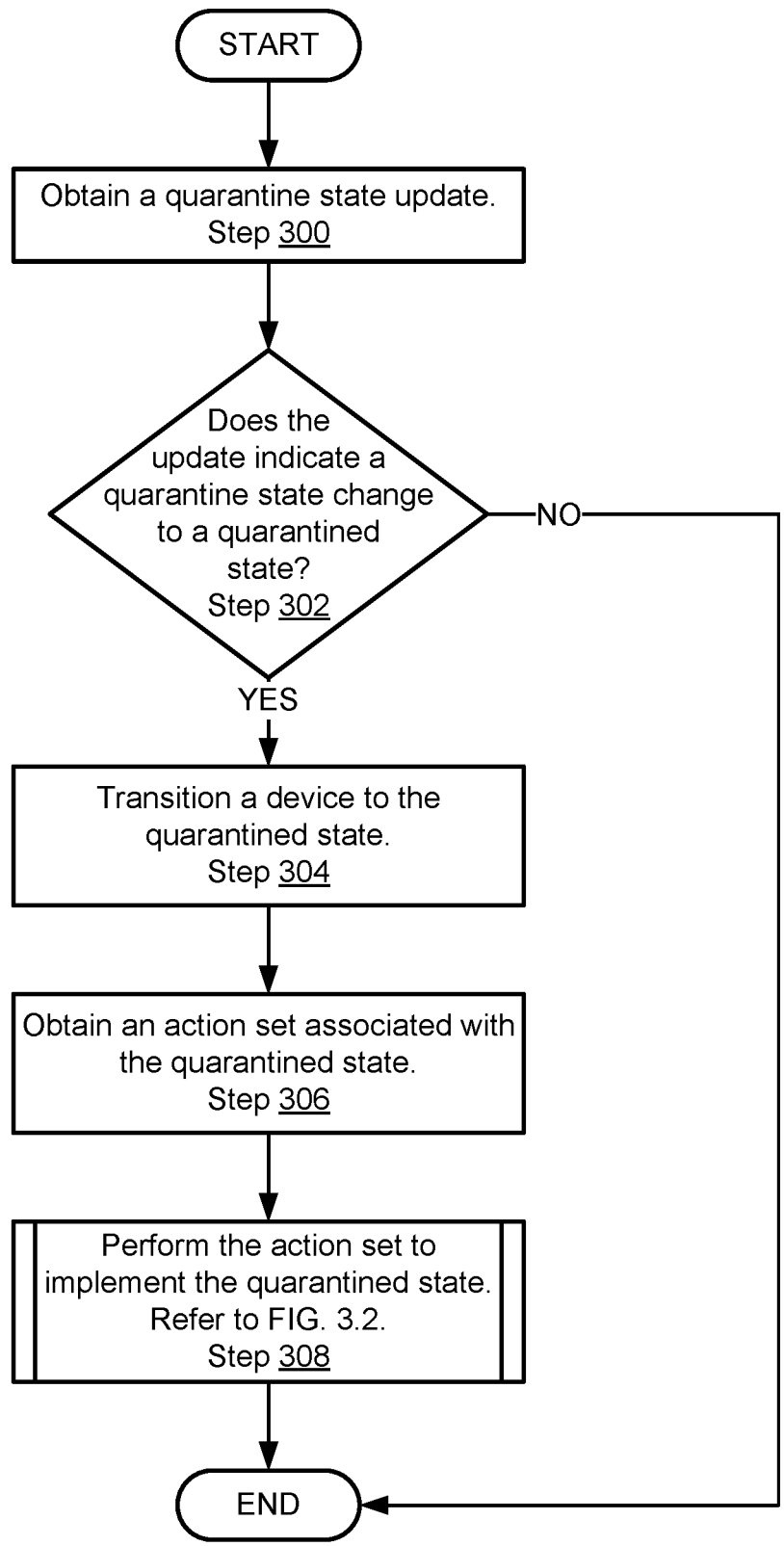
FIG. 3.1

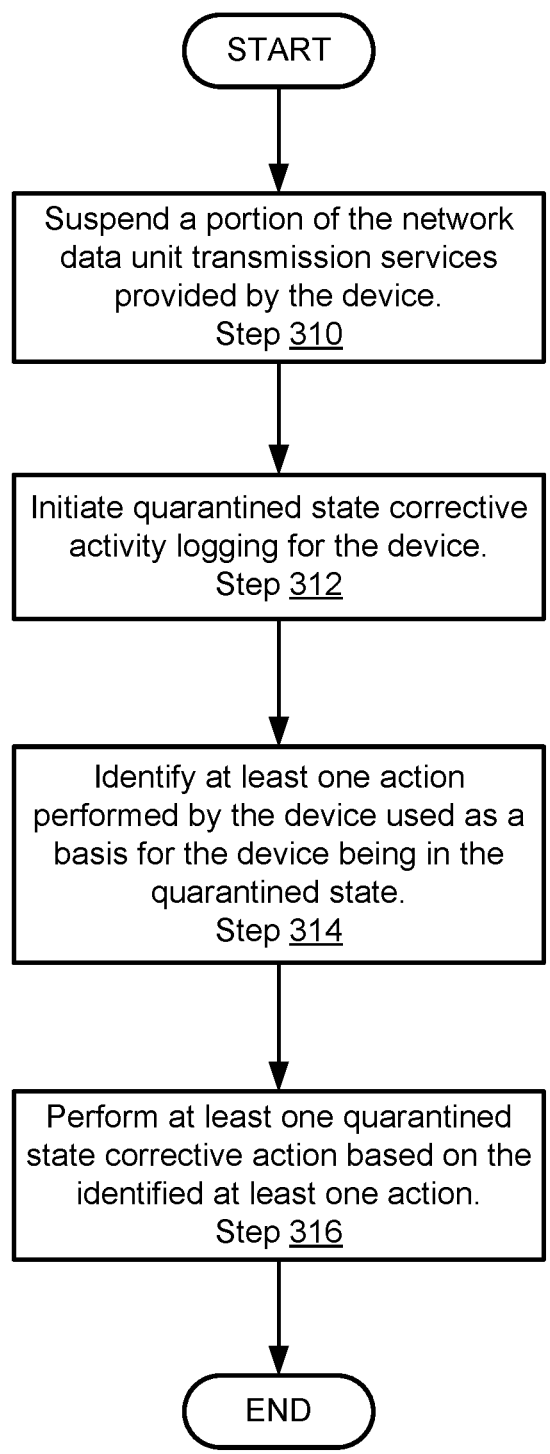
FIG. 3.2

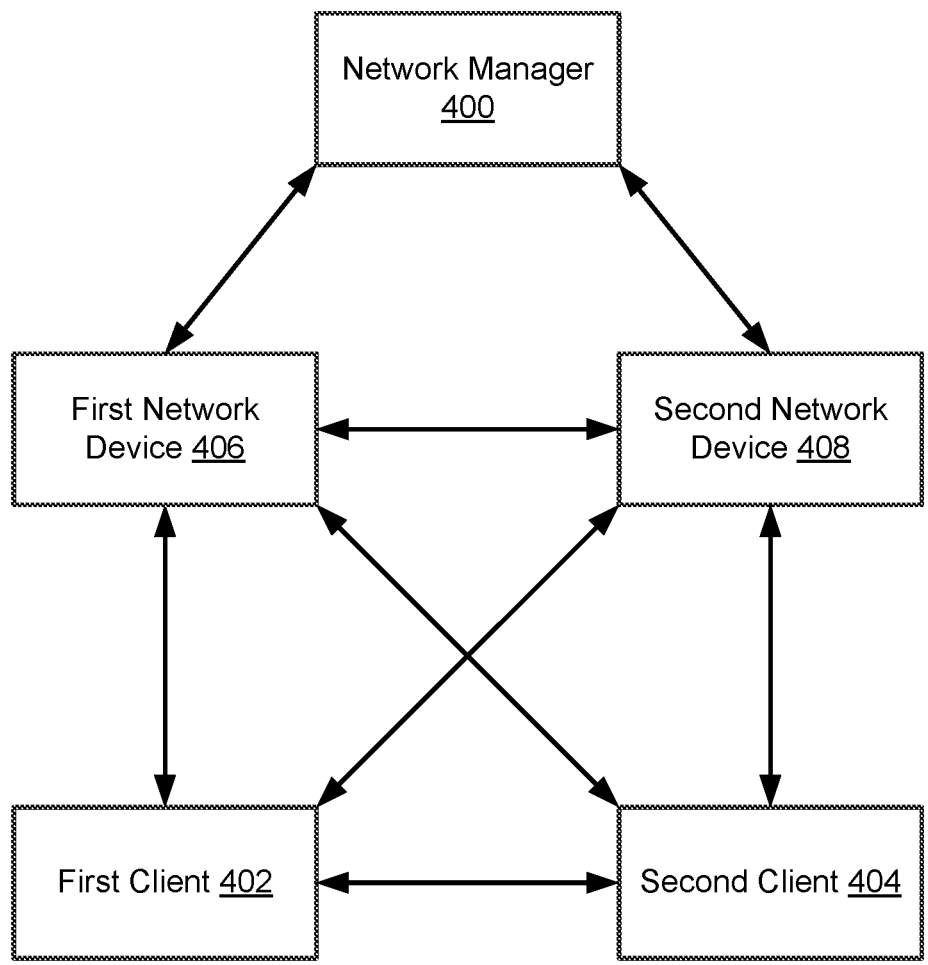
FIG. 4.1

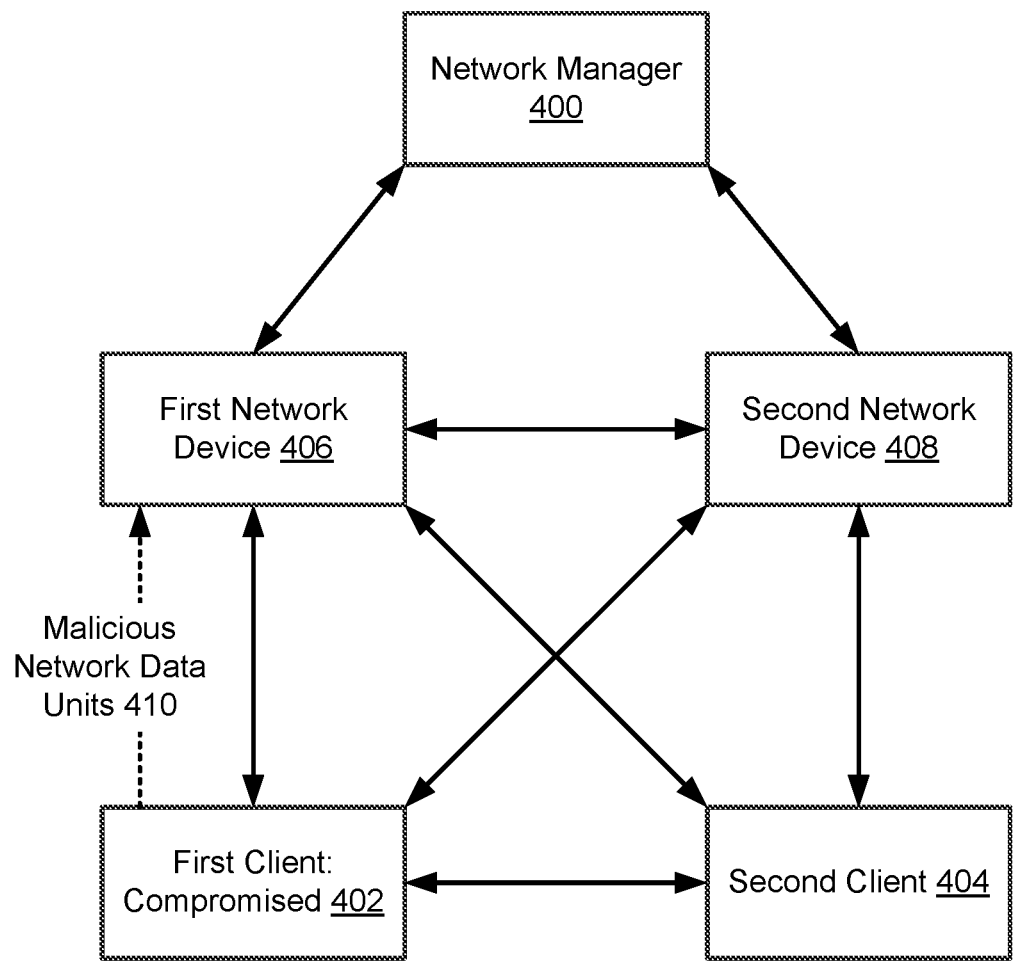
FIG. 4.2

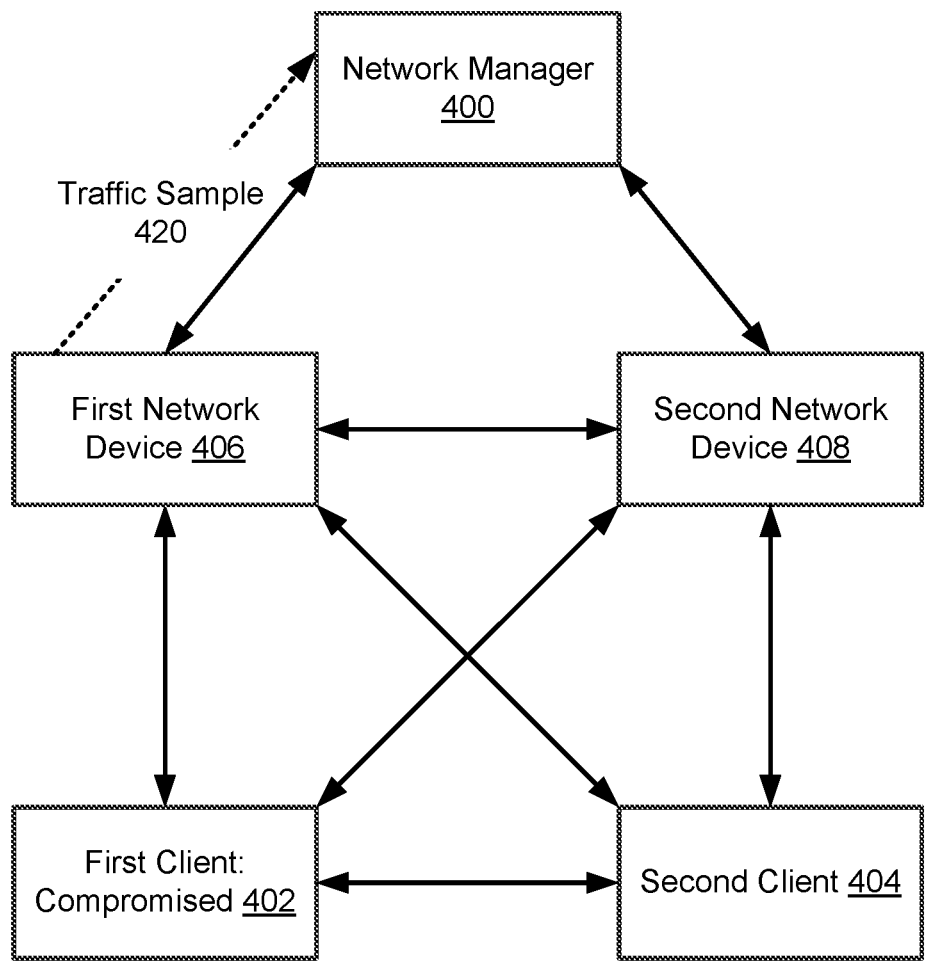
FIG. 4.3

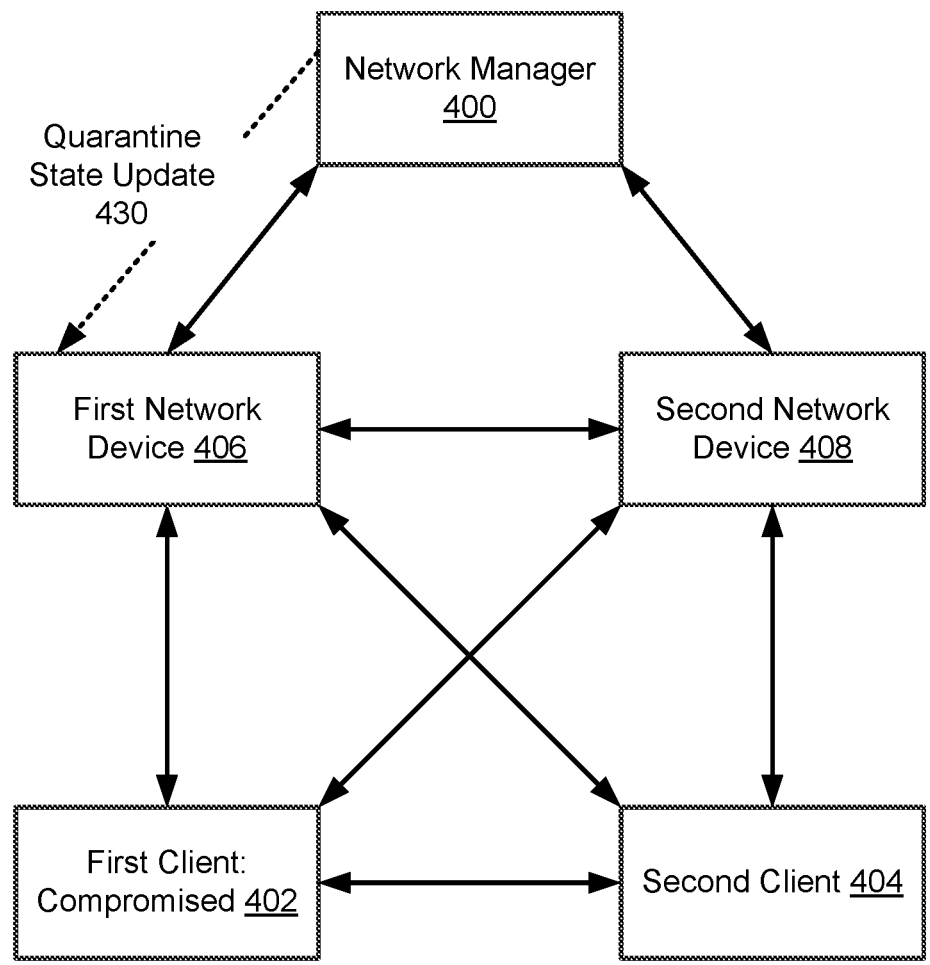
FIG. 4.4

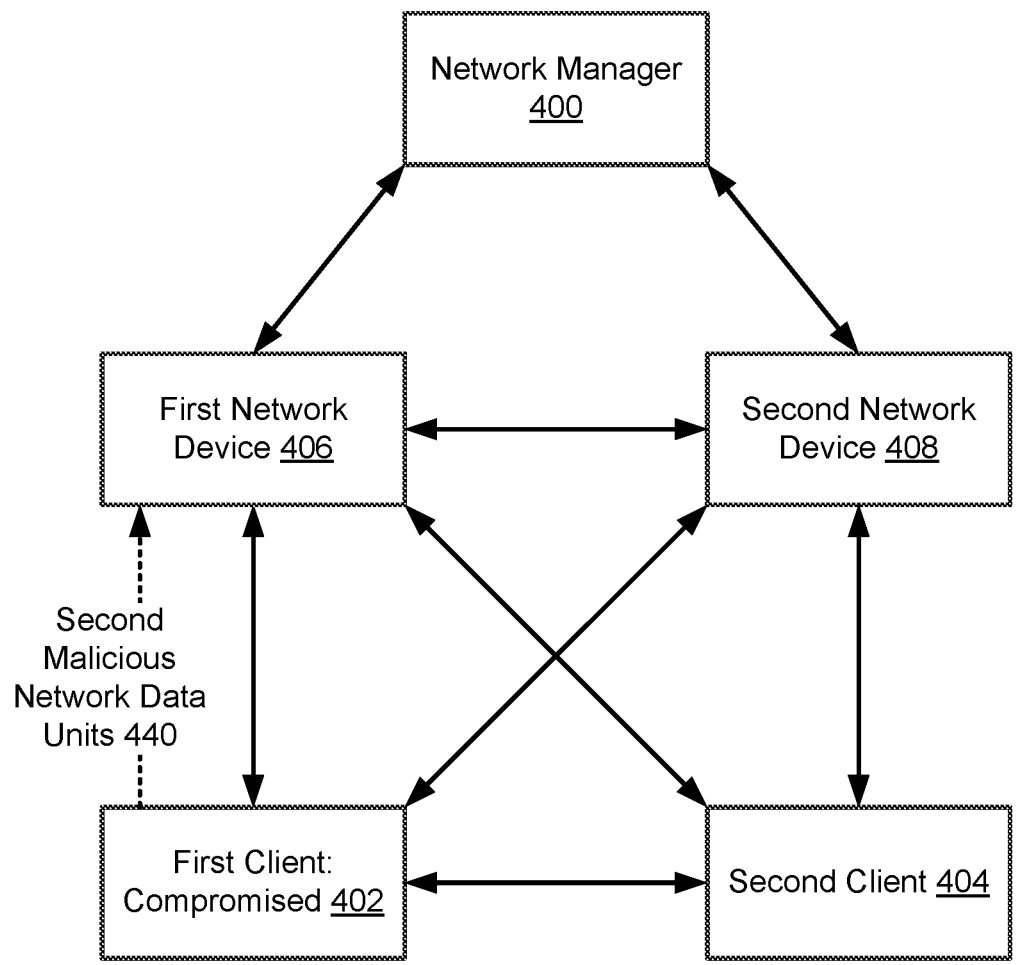
FIG. 4.5

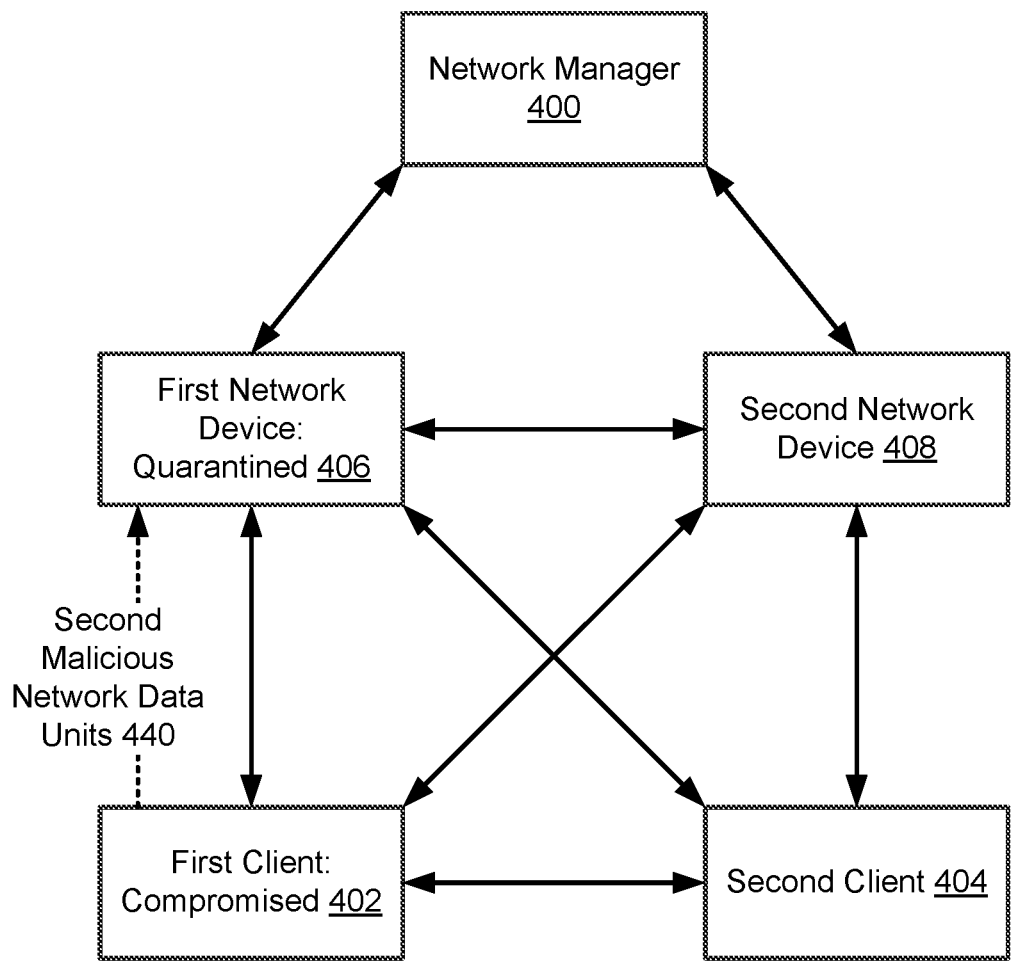
FIG. 4.6

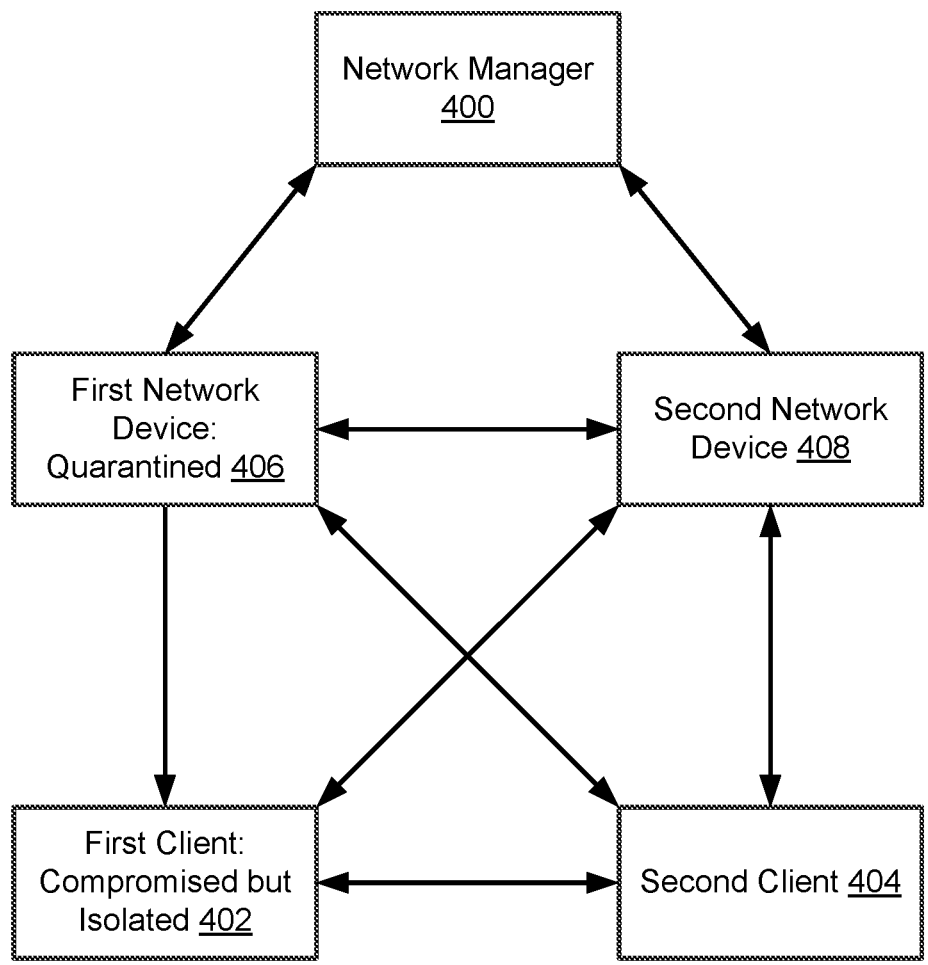
FIG. 4.7

SYSTEM AND METHOD FOR DEVICE QUARANTINE MANAGEMENT

BACKGROUND

A communication system may enable devices to communicate with one another. The communication system may include devices that relay information from a sending device to a destination device.

SUMMARY

In one aspect, a method in accordance with one or more embodiments disclosed herein is for managing a network that includes network devices that provide network data unit transmission services based on respective quarantine states of the network devices and a network manager that manages the quarantine states, the method includes obtaining, by the network manager, a signature of a device that participates in the network topology, the signature indicating that the device is operating in an undesired manner; making a determination, by the network manager and based on signature, that the device should be in a quarantined state; in response to making the determination: generating, by the network manager, a quarantine state update that indicates that the device is in the quarantined state; and sending, by the network manager, the quarantine state update to the device. The quarantine state update does not indicate how a quarantine associated with the device is implemented.

In one aspect, a non-transitory computer readable medium in accordance with one or more embodiments disclosed herein includes computer readable program code, which when executed by a computer processor enables the computer processor to perform a method for managing a network topology comprising network devices that provide network data unit transmission services based on respective quarantine states of the network devices and a network manager that manages the quarantine states, the method includes obtaining, by the network manager, a signature of a device that participates in the network topology, the signature indicating that the device is operating in an undesired manner; making a determination, by the network manager and based on signature, that the device should be in a quarantined state; in response to making the determination: generating, by the network manager, a quarantine state update that indicates that the device is in the quarantined state; and sending, by the network manager, the quarantine state update to the device. The quarantine state update does not indicate how a quarantine associated with the device is implemented.

In one aspect, a network manager in accordance with one or more embodiments disclosed herein manages a network topology, the network manager includes storage for storing a signature of a network device of the network topology. The network manager also includes a device state manager that obtains a signature of a device that participates in the network topology, the signature indicating that the device is operating in an undesired manner; makes a determination, based on signature, that the device should be in a quarantined state; in response to making the determination: generates, by the network manager, a quarantine state update that indicates that the device is in the quarantined state; and sends, by the network manager, the quarantine state update to the device. The quarantine state update does not indicate how the quarantined state is implemented.

BRIEF DESCRIPTION OF DRAWINGS

Certain embodiments disclosed herein will be described with reference to the accompanying drawings. However, the accompanying drawings illustrate only certain aspects or implementations of the embodiments disclosed herein by way of example and are not meant to limit the scope of the claims.

FIG. 1.1 shows a diagram of a system in accordance with one or more embodiments disclosed herein.

FIG. 1.2 shows a logical diagram of a network device in accordance with one or more embodiments disclosed herein.

FIG. 1.3 shows a logical diagram of a network manager in accordance with one or more embodiments disclosed herein.

FIG. 2.1 shows a flowchart of a method of quarantining a network device in accordance with one or more embodiments disclosed herein.

FIG. 2.2 shows a flowchart of a method of enforcing a quarantine in accordance with one or more embodiments disclosed herein.

FIG. 3.1 shows a flowchart of a method of processing a quarantine state update in accordance with one or more embodiments disclosed herein.

FIG. 3.2 shows a flowchart of a method of performing an action set to quarantine a network device in accordance with one or more embodiments disclosed herein.

FIGS. 4.1-4.7 show logical diagrams of a non-limiting example of a system over a period of time in accordance with embodiments disclosed herein.

DETAILED DESCRIPTION

Figure 5:
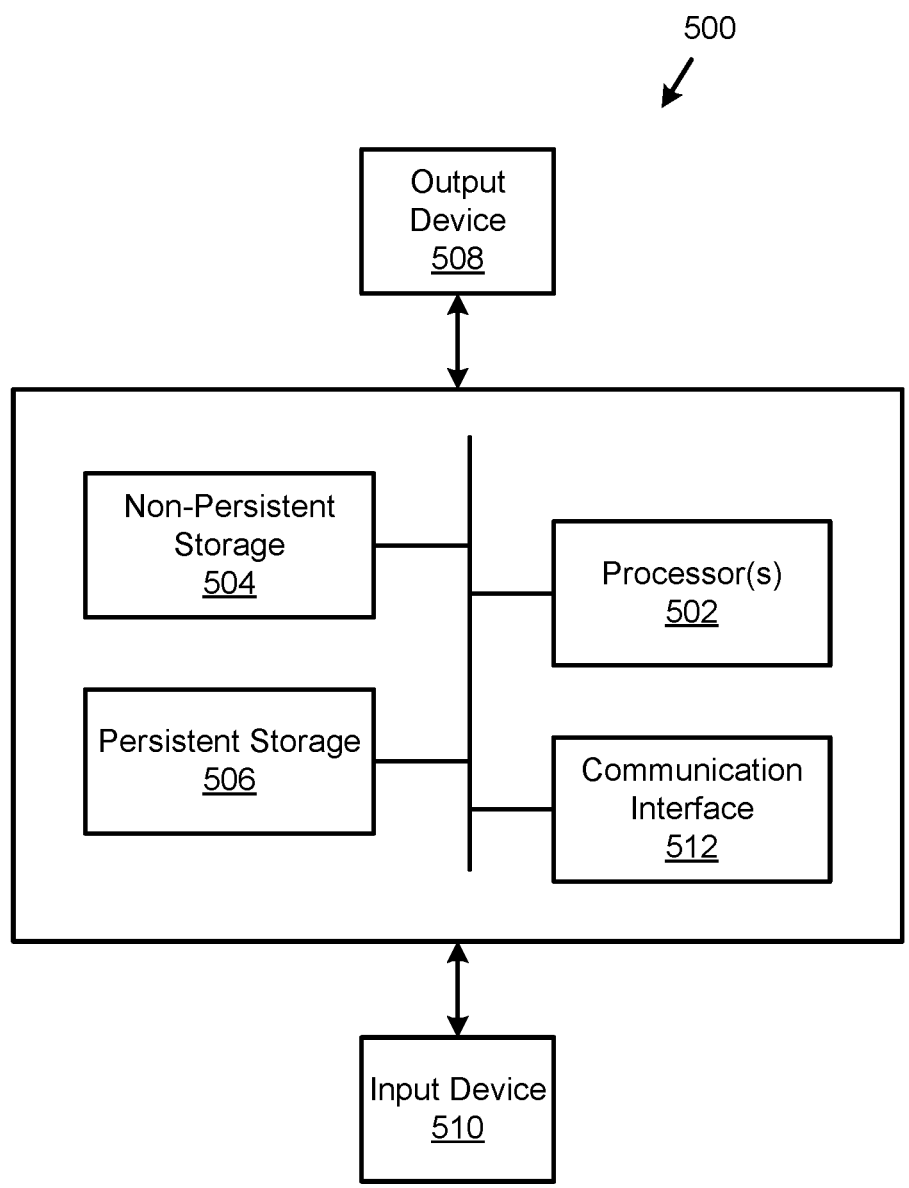
FIG. 5 shows a diagram of a computing device in accordance with one or more embodiments disclosed herein.

In communication systems, any number of devices (e.g., network devices) may cooperate to provide communication services. Communication services may include transmission of network data units (e.g., network data unit transmission services) from a first device to a second device through any number of intermediary devices such as network devices.

To cooperate to provide the communication services, each of the devices may operate in one or more predetermined manners. The predetermined manners may be specified by, for example, common standards for transmission of network data units. Consequently, each device may rely on how the other devices will respond to transmissions of network data units.

If a device fails to operate in the predetermined manners (e.g., an undesired manner), the device may negatively impact the ability of the communication system to provide communication services. For example, a device operating in an undesired manner may transmit network data units that are malformed (e.g., unreadable, unusable for communication purposes, etc.) which prevents the transmitted network data units from being used for communication purposes.

In another example, a device operating in an undesired manner may transmit network data units that are malicious. The malicious network data units may include information designed to compromise other network devices.

In a still further example, a device operating in an undesired manner may fail to forward (e.g., transmit towards a destination device) network data units that are destined for the network device.

In an additional example, a device may operating in an undesired manner be a client such as a personal electronic device (e.g., cell phone, personal digital assistant, tablet computer, laptop computer, desktop computer, etc.) that has been compromised or otherwise operates in an undesired manner. The aforementioned operation of the device may impact the ability of network devices or other types of devices from performing their respective functionality.

To limit the impact of devices operating in undesired manners on a communication system, the devices, devices that interact with devices operating in an undesired manner, and/or other devices may be quarantined. Quarantining a device may reduce the impact that the device has on the communication system. A device may be quarantined, in part, by, for example, limiting the ability of the device to transmit network data units (e.g., shutting off ingress ports of neighbor devices), terminating applications hosted by the device (or other devices interacting with the to be quarantined device), logging the actions performed by the device (or other impacted devices) for analysis to identify why the device or an impacting device is operating in an undesired manner, etc.

However, quarantining a device may be challenging. If a management entity identifies that a device should be quarantined, the management entity may need to take action to quarantine the device. If the management entity implements a message passing system for management purposes, the management entity may need to perform numerous actions for quarantining the device. These actions may include (i) identifying actions to be performed by the device for it to be quarantined, (ii) instructing the device to perform the actions, (iii) verifying that the device has performed the actions, (iv) identifying whether the actions performed by the device have effectively quarantined the device, and/or (v) instructing the device to perform additional actions if the device has not been effectively quarantined.

The above noted actions required to be performed by the management entity may place a large computational load on the management entity. For example, consider a scenario where a management entity determines that a device should be quarantined. The management entity may first need to ascertain the type of the device, including the physical and logical components of the device, to identify actions that need to be performed by the device for it to be effectively quarantined.

After identifying the actions to be performed by the device, the management entity may need to instruct the device to perform the actions. Once instructed, the management entity may need to follow up with or otherwise verify that the device has performed the actions. The device may not perform the actions if, for example, the device unexpectedly restarts, the device unexpectedly freezes, the device does not receive all or a portion of the instructions, the device delays performing the actions due to other, ongoing workloads, etc. If the management entity identifies that the device has not performed the actions, the management entity may need to send additional instructions (e.g., reinstruct the device).

After the management entity verifies that the device has performed the actions, the management entity may need to obtain additional information to verify that the actions performed by the device have effectively quarantined the device. If the management entity determines that the device is still not effectively quarantined, the management entity may need to identify and send additional instructions. The management entity may need to repeatedly perform this process of verification and additional instruction repeatedly until the management entity verifies that the device is effectively quarantined.

The above example illustrates that quarantining a device using a message passing system for quarantine management may place a large load on the management entity (and/or other intermediary entities subject to passing messages on behalf of the management entity). Further, in systems that utilize virtualization (or other ways of logically allocating resources), large numbers of logical entities may need to be managed for quarantine purposes even when a limited number of hardware devices are actually being managed by the management entity. Consequently, quarantine management of an even small number of hardware devices may consume a disproportionately large quantity of the management entity's (and/or system resources) computing resources.

To address the above noted and/or other issues, embodiments disclosed herein may provide systems, methods, and devices for quarantining devices using state representations. Specifically, devices of a system may implement state based management systems that cause the operation of the devices to conform to one or more states. After a state of a device is modified, the device may automatically and independently change its manner of operation to conform to the change in state.

To quarantine a device, the state management system of a device may manage the operation of the device based on a quarantine state of a device. The quarantine state of the device may specify whether the device is or is not quarantined (and/or other information relevant to device quarantines). Accordingly, to quarantine a device, a management entity may only need to update the quarantine state of the device to quarantine the device. Once the state of the device is quarantined, the device may automatically take action to modify its operation to conform to its quarantine state.

Consequently, the management entity may not need to (i) identify actions to be performed by the device to quarantine it, (ii) follow up with the device to verify that the device has performed the actions, or (iii) verify that the actions performed by the device have effectively quarantined it to quarantine a device. Further, because the quarantine state of the device only needs to be modified to quarantine the device, unexpected restarts or other actions performed by the device are unlikely to prevent the device from being quarantined.

Thus, by implementing a state based approach for quarantining devices, a system in accordance with embodiments disclosed herein may reduce the overhead required for quarantining devices, may be capable of quarantining more devices without overloading management entities responsible for quarantining devices, and may be less susceptible to quarantine failures due to unexpected restarts of quarantined devices.

In the text that follows, a description of components of a system in accordance with embodiments disclosed herein is provided with respect to FIGS. 1.1-1.3. After the description of the components of the system, a description of methods that may be performed by the system of FIG. 1.1 is provided with respect to FIGS. 2.1-3.2. Following the description of the methods, an example series of actions that may be performed by the system of FIG. 1.1 is provided with respect to FIGS. 4.1-4.7. Lastly, a description of a computing device that may be used to implement the system of FIG. 1.1 is provided with respect to FIG. 5.

FIG. 1.1 shows a diagram of an example system in accordance with one or more embodiments described herein. The system may include clients (e.g., 5, 7) that communicate with one another (and/or other devices not illustrated in FIG. 1.1) using network (10). To enable clients and/or other devices to communicate, network (10) may provide services to the clients including network data unit transmission services. By providing network data unit transmission services, network (10) may enable clients to communicate with each other and/or with other devices.

To provide network data unit transmission services, network (10) may include any number of network devices (15). Network devices (15) may implement any number and/or type of communication protocols. The implemented protocols may enable network data units provided to network (10) to be transmitted to devices to which the network data units are to be provided (e.g., recipients).

Each of the network devices (e.g., 15A, 15N) of network (10) may be connected to other network devices in any type of network topology (e.g., an arrangement of network devices having any number of operable connections between all and/or different portions of the network devices). Network devices (15) may cooperatively provide network data unit transmission services in accordance with the network topology implemented by network (10).

For example, first client (5) may desire to send network data units to second client (7) to provide second client (7) with information. To do so, first client (5) may generate network data units and provide the network data units to one of the network devices (e.g., 15A) of network (10). Network devices (15) may transmit the network data units between themselves and/or other devices until the network data units are transmitted to second client (7). The path through which the network data units flow through network devices (15) may depend on the network topology and communication protocols implemented by network (10).

For network data units to flow through network (10) in an efficient manner, network devices (15) may need to operate in a cooperative manner due to, for example, the limited number of operable connections between network devices (e.g., 15A, 15N), the limited communication bandwidth between network devices (15), and/or other types of physical and/or logical limitations (e.g., limitations due to communication protocols implemented by network (10)) on network data unit transmissions by network (10).

For example, if one of the network devices (e.g., 15A) of network (10) (and/or the clients served by the network) has been compromised due to partial failure of a physical component, malicious attack by a nefarious person, and/or a software bug, the network device may fail to provide network data unit transmission services in a manner consistent (i.e., operate in an undesired manner) with expectations of the other network devices. Consequently, the network device may, for example, cause network data units to be lost, network data units to be transmitted that do not include useful information (e.g., malformed network data units), network data units to be transmitted that include malicious information (e.g., snooping/spoofed network data units), and/or otherwise transmit network data units that negatively impact the ability of network (10) to provide communication services because the transmitted network data units do not conform to the expectations of the other network devices.

Similarly, if a client device is operates in an undesired manner, the client device may impact the ability of the network to provide its functionality by sending malformed or malicious network data units, operating in a manner inconsistent with a design of the network, and/or for other reasons.

Embodiments disclosed herein may provide methods, systems, and devices for improving the quality of communication services provided by a network (e.g., 10). To do so, a system in accordance with embodiments disclosed herein may include network manager (20). Network manager (20) may manage the quality of communication services provided by a network by limiting the impact of devices that are operating in an undesired manner. To do so, network manager (20) may ascertain when devices are operating in a manner inconsistent with the design of network (10) or otherwise in an undesired manner that indicates that the system of FIG. 1.1 would better operate if one or more of the devices are quarantined.

For example, network manager (20) may obtain information reflecting the network data unit transmission services provided by a network device and used the aforementioned services as a basis for determining whether the network device is positively contributing to communication services provided by network (10). When the network manager (20) determines that a network device is not contributing to the communication services provided by network (10), network manager (20) may quarantine the network device. Quarantining the network device may limit the impact on network data unit transmission services provided by other devices of network (10). For example, if the network device is receiving malicious network data units from a client, the network manager (20) may update the state of the network device to be quarantined to limit the impact of the malicious network data units on network (10).

To quarantine the network device, network manager (20) may assume that the network device is operating in accordance with a state model. The state model may dictate that the network device operate in accordance with predetermined states. A network device that is operating in accordance with a state model may maintain a listing of its one or more states and conform its operation to the listed states. For example, the network device may restrict its operation or expand its operation depending on its one or more states.

The state model implemented by network devices (15) may include a quarantine state. The quarantine state may specify whether the network device is quarantined (e.g., a quarantined state) or not quarantined. Network manager (20) may modify the quarantine state of a network device to reflect that it is quarantined (e.g., set the quarantine state of the network device to quarantined). The network device may then, independently and in a manner that is potentially unknown to network manager (20), take action to conform its operation to its quarantine state.

Network manager (20) may modify the quarantine state of the network device by providing a quarantine state update to the network device. The quarantine state update may specify the quarantine state of the network device.

As noted above, network manager (20) may be unaware of how the network device will operate when in a quarantined state. Rather, network manager (20) may assume that the network device will perform actions in accordance with and/or operate consistently with its quarantined state. In other words, network manager (20) may assume that the network device will take appropriate action to conform its operation to be consistent to its quarantine state. Consequently, once network manager (20) modifies a quarantine state of a network device, network manager (20) may assume that the network device implements the quarantine state.

For example, when a network device is in a quarantined state, the network device may perform one or more actions. These actions may, for example, (i) isolate the network device from all, or a portion, of the network topology to which the network device is operably connected, (ii) limit the types of network data units that the network device may transmit to other devices, (iii) terminate services executing on the network device resulting in changes to the network data unit transmission services provided by the network device, (iv) begin logging of actions performed by the network device, and/or (v) perform other actions that may limit the impact of the network device on the network topology to which the network device is operably connected. However, network manager (20) may not know of the actions that the network device will perform or check to verify that the network device has performed some actions to conform its operation to its quarantine state.

By making the aforementioned assumptions, the workload on network manager (20) may be greatly reduced. For example, network manager (20) may not need to provide detailed instructions with respect to how to quarantine a device. Further, network manager (20) need not create customized instructions for implementing a quarantine that is tailored to a type of the device. For example, each network device of network devices (15) may need to perform different actions to conform their operation to their respective quarantine states. Consequently, the computational cost for network manager (20) to quarantine a device may be greatly reduced when compared to providing actions tailored to a device that will cause the device to be quarantined.

Additionally, network manager (20) may not need to expend computational resources to verify that a quarantined device is operating in a manner consistent with being quarantined. Rather, network manager (20) may utilize state based management systems implemented by the network device to rely on the network devices to implement the quarantines without need for monitoring by network manager (20).

For example, consider a scenario where a network manager does not rely on a state based management system implemented by network devices to selectively quarantine the network devices. In such a scenario, the network manager may instruct a network device to perform a series of actions to quarantine the network device. However, the network device will only be quarantined (i.e., perform actions that limit its impact on the other devices of a network) if the network device completes the series of actions. Consequently, the network manager must verify that the network device completes the actions to ensure that the network device is quarantined. The process of verifying that the network device completes the actions may be a computationally expensive process. Further, the aforementioned process of verification may not be reasonably implementable in a system that includes thousands of devices that may need to be quarantined at various points of time.

By implementing the above described approach to quarantine management, a network in accordance with embodiments disclosed herein may enable devices to be granularly quarantined in a computationally efficient manner. Consequently, the network may provide improved network data unit transmission services by marshalling limited computing resources toward providing such services rather than towards managing the quarantine states of devices of the network.

Any of the components of FIG. 1.1 may be operably connected by any combination and/or number of wired and/or wireless connections.

Any of the devices of FIG. 1.1 may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2.1-3.2. The devices of FIG. 1.1 may be implemented using other types of computing devices without departing from the embodiments disclosed herein. For additional details regarding computing devices, refer to FIG. 5.

The devices of FIG. 1.1 may be implemented using logical devices without departing from embodiments disclosed herein. For example, the devices of FIG. 1.1 may be implemented using virtual machines that utilize computing resources of any number of physical computing devices (refer to FIG. 5) to provide their respective functionalities. The devices of FIG. 1.1 may be implemented using other types of logical devices without departing from embodiments disclosed herein.

To further clarify aspects of network devices, a diagram of an example of a network device is provided in FIG. 1.2. Any of the network devices of FIG. 1.1 may be similar to the example network device illustrated in FIG. 1.2.

FIG. 1.2 shows a logical diagram of example network device (100) in accordance with one or more embodiments described herein. Example network device (100) may provide network data unit transmission services. Any of the network devices illustrated in FIG. 1.1 may be similar to example network device (100).

To provide the above noted functionality of example network device (100), example network device (100) may include state manager (102), network data unit processor (104), network information manager (106), and storage (108). Each of these components of example network device (100) is discussed below.

In one or more embodiments disclosed herein, state manager (102) is implemented using a hardware device including circuitry. State manager (102) may include, for example, one or more of a digital signal processor, a field programmable gate array, and/or an application specific integrated circuit. The circuitry of the aforementioned devices may be adapted to provide the functionality of state manager (102). State manager (102) may be implemented using other types of hardware devices without departing from the embodiments disclosed herein.

In one or more embodiments disclosed herein, state manager (102) is implemented using computing code stored on a persistent storage that when executed by a processor of example network device (100) performs the functionality of state manager (102). The processor may be a hardware processor including circuitry such as, for example, a central processing unit or a microcontroller. The processor may be other types of hardware devices for processing digital information without departing from the embodiments disclosed herein.

In one or more embodiments disclosed herein, state manager (102) provides state management services. The state management services may include (i) obtaining state updates, (ii) updating state repository (118) based on the obtained state updates, and (iii) conforming the operation of example network device (100) to states specified by state repository (118).

State manager (102) may obtain state updates from a network manager and/or other devices. The state updates may specify one or more current states of example network device (100). The current states may be inconsistent with those listed in state repository (118).

State manager (102) may update state repository (118) based on obtained state updates by conforming the states specified by state repository (118) to those specified by the obtained state updates. For example, if state repository (118)

specifies that example network device (100) is not quarantined but a state update is obtained that specifies example network device (100) is quarantined, state manager (102) may update state repository (118) to indicate that example network device (100) is quarantined.

State manager (102) may conform the operation of example network device (100) to states specified by state repository (118) by performing one or more of: (i) performing one or more predetermined actions, (ii) modifying the functionality of example network device (100), (iii) initiating logging of information regarding operation of example network device (100), and/or (iv) performing other actions that may modify the operation of example network device (100) and/or otherwise improve the ability of a network of which example network device (100) is a member to provide network data unit transmission services. By doing so, the impact of example network device (100) on the network may be limited or otherwise modified.

As noted above, state manager (102) may perform predetermined actions when example network device (100) changes its state. These actions may include, for example, (i) limiting transmission of network data units out of one or more of its ports, (ii) initiating diagnostic testing of one or more components of example network device (100), (iii) initiating corrective action such as rebooting components (e.g., network data unit processor (104)), (iv) obtaining logs from one or more components, (v) sending logs and/or information to other devices, (vi) initiating inter-device diagnostic testing (e.g., sending predetermined network data unit sequences to other devices), and/or (vii) performing other types of actions that may be useful in ascertaining why example network device (100) may be negatively impacting a network.

The actions performed by the state manager (102) may be tailored to the example network device (100). Consequently, other network devices may perform different and/or similar predetermined actions when quarantined by virtue of the actions that the other network devices performed being tailored to the respective network devices (and/or other types of devices that may be quarantined through state management).

While not illustrated in FIG. 1.2, example network device (100) may store listing of actions to be performed in storage (108) when and/or during quarantine.

In one or more embodiments disclosed herein, network data unit processor (104) is implemented using a hardware device including circuitry. Network data unit processor (104) may include, for example, one or more of a digital signal processor, a field programmable gate array, and/or an application specific integrated circuit. The circuitry of the aforementioned devices may be adapted to provide the functionality of network data unit processor (104). Network data unit processor (104) may be implemented using other types of hardware devices without departing from the embodiments disclosed herein.

In one or more embodiments disclosed herein, network data unit processor (104) is implemented using computing code stored on a persistent storage that when executed by a processor of example network device (100) performs the functionality of network data unit processor (104). The processor may be a hardware processor including circuitry such as, for example, a central processing unit or a microcontroller. The processor may be other types of hardware devices for processing digital information without departing from the embodiments disclosed herein.

Network data unit processor (104) may provide network data unit transmission services. The network data unit transmission services may include (i) obtaining network data units, (ii) identifying how to forward the network data units, and (iii) forwarding the network data units.

To identify how to forward the network data units, network data unit processor (104) may utilize forwarding information base (not shown). Network data unit processor (104) may perform a look up using information included in each network data unit to identify information included in the forwarding information base that may be used to forward each respective network data unit towards a recipient. Forwarding may include, for example, transmitting a network data unit to another network device via a port.

In one or more embodiments disclosed herein, network information manager (106) is implemented using a hardware device including circuitry. Network information manager (106) may include, for example, one or more of a digital signal processor, a field programmable gate array, and/or an application specific integrated circuit. The circuitry of the aforementioned devices may be adapted to provide the functionality of network information manager (106). Network information manager (106) may be implemented using other types of hardware devices without departing from the embodiments disclosed herein.

In one or more embodiments disclosed herein, network information manager (106) is implemented using computing code stored on a persistent storage that when executed by a processor of example network device (100) performs the functionality of network information manager (106). The processor may be a hardware processor including circuitry such as, for example, a central processing unit or a microcontroller. The processor may be other types of hardware devices for processing digital information without departing from the embodiments disclosed herein.

Network information manager (106) may provide network information services. Network information services may include (i) obtaining information regarding network data units transmitted by example network device (100), (ii) obtaining information regarding network data units obtained by example network device (100), (iii) information regarding example network device (100) and/or other network devices, and/or (iv) providing the aforementioned information to other devices including, for example, a network manager.

The information provided by example network device (100) may enable other devices to ascertain whether example network device (100) and/or other network devices are positively contributing to network data unit transmission services provided by a network. For example, the information may indicate whether example network device and/or other network devices have been compromised (e.g., dysfunctional, under attack/controlled by a malicious actor, etc.).

State manager (102), network data unit processor (104), and/or network information manager (106) may perform all, or a portion, of the methods illustrated in FIGS. 2.1-3.2 when providing all, or a portion, of their functionality.

In one or more embodiments disclosed herein, the storage (108) is implemented using devices that provide data storage services (e.g., storing data and providing copies of previously stored data). The devices that provide data storage services may include hardware devices and/or logical devices. For example, storage (108) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (108) may include a memory device (e.g., a dual in line memory device) in which data is stored and from which copies of previously stored data are provided. In another example, storage (108) may include a persistent storage device (e.g., a solid state disk drive) in which data is stored and from which copies of previously stored data is provided. In a still further example, storage (108) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage (108) may store data structures including state repository (118) and local network information (120). Each of these data structures is discussed below.

State repository (118) may be implemented using one or more data structures. The data structures may include information regarding one or more states of example network device (100). The information may include a quarantine state of example network device (100). The quarantine state may specify, for example, (i) whether example network device (100) is quarantined, (ii) actions to be performed when quarantined and/or when not quarantined, (iii) time stamps or other identifiers specifying when and/or for how long example network device (100) is quarantined, (iv) a description or other indication of why example network device (100) is quarantined, (v) log information of actions performed by example network device (100) when quarantined and/or when not quarantined, and/or (vi) other information that may be relevant to quarantining and/or managing example network device (100) when quarantined.

State repository (118) may be implemented using, for example, a table. At least one row in the table may correspond to a quarantine state of example network device (100). The elements of the row may reflect the information regarding the quarantine state of example network device (100), discussed above. State repository (118) may be maintained, at least in part, by state manager (102)

Local network information (120) may be implemented using or more data structures. The data structures may include information obtained by network information manager (106), discussed above. Local network information (120) may be maintained, at least in part, by network information manager (106).

Local network information (120) may be implemented using, for example, a table. The rows of the table may include information maintained by network information manager (106).

As used above with respect to storage (108), maintain means to update (e.g., modify, delete, and/or add information) the aforementioned data structures in accordance with changes made to the information upon which the data structures are based. Updating may occur continuously, periodically, at scheduled points in time, responsively to changes, or in other manners. Consequently, the aforementioned data structures may not reflect the information upon which the data structures are based at all points in time.

While the data structures stored in storage (108) have been described as including a limited amount of specific information, any of the data structures stored in storage (108) may include additional, less, and/or different information without departing from the embodiments disclosed herein. Further, the aforementioned data structures may be combined, subdivided into any number of data structures, may be stored in other locations (e.g., in a storage hosted by another device), and/or spanned across any number of devices without departing from the embodiments disclosed herein. Additionally, while described as being implemented using tables, the data structures stored in storage (108) may be implemented using other types of data structures such as, for example, lists, linked lists, databases, text files, and/or other types of data structures.

Additionally, while example network device (100) has been illustrated as including a limited number of specific components, example network device (100) may include fewer, different, and/or additional components without departing from embodiments disclosed herein.

As discussed with respect to FIG. 1.1, network (10) may include network manager (20). Network manager (20) may manage the quarantine states of any number of devices.

FIG. 1.3 shows a logical diagram of example network manager (150) in accordance with one or more embodiments described herein. Network manager (20) of FIG. 1.1 may be similar to example network manager (150).

To provide the above noted functionality of example network manager (150), example network manager (150) may include device state manager (152) and storage (154). Each of these components of example network manager (150) is discussed below.

In one or more embodiments disclosed herein, device state manager (152) is implemented using a hardware device including circuitry. Device state manager (152) may include, for example, one or more of a digital signal processor, a field programmable gate array, and/or an application specific integrated circuit. The circuitry of the aforementioned devices may be adapted to provide the functionality of device state manager (152). Device state manager (152) may be implemented using other types of hardware devices without departing from the embodiments disclosed herein.

In one or more embodiments disclosed herein, device state manager (152) is implemented using computing code stored on a persistent storage that when executed by a processor of example network manager (150) performs the functionality of device state manager (152). The processor may be a hardware processor including circuitry such as, for example, a central processing unit or a microcontroller. The processor may be other types of hardware devices for processing digital information without departing from the embodiments disclosed herein.

In one or more embodiments disclosed herein, device state manager (152) provides state management services. By providing state management services, the operation of network (10, FIG. 1.1) may be improved by, for example, quarantining compromised network device.

To provide state management services, device state manager (152) may (i) obtain information regarding devices to which the quarantine management services are to be provided, (ii) determine, based on the obtained information, whether any devices should be quarantined or not quarantined, and (iii) quarantine devices based on the determination. By doing so, compromised devices may be selectively quarantined thereby reducing the impact of the quarantined devices on a network in which the devices reside.

When quarantining devices, device state manager (152) may assume that the devices operate using a state management system. Consequently, once device state manager (152) sends a state update message reflecting a change in quarantine state change for a device, the device state manager (152) may assume that the corresponding device operates in accordance with its updated quarantine state. Accordingly, device state manager (152) may manage quarantine states in a manner that is more computationally efficient, scalable, and/or otherwise more likely to result in effective quarantine management when compared to, for example, implementations relying on active management including verification by the device state manager (152) (and/or other management entities).

Device state manager (152) may perform all, or a portion, of the methods illustrated in FIGS. 2.1-3.2 when providing all, or a portion, of its functionality.

In one or more embodiments disclosed herein, storage (154) is implemented using devices that provide data storage services (e.g., storing data and providing copies of previously stored data). The devices that provide data storage services may include hardware devices and/or logical devices. For example, storage (154) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (154) may include a memory device (e.g., a dual in line memory device) in which data is stored and from which copies of previously stored data are provided. In another example, storage (154) may include a persistent storage device (e.g., a solid state disk drive) in which data is stored and from which copies of previously stored data is provided. In a still further example, storage (154) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage (154) may store data structures including network information repository (162) and/or network state repository (164). Each of these data structures is discussed below.

Network information repository (162) may be implemented using one or more data structures. The data structures may include information that may be used to ascertain whether devices should be quarantined. For example, the network information repository may include information obtained from network devices, as noted above. The information may include the local network information obtained by network devices. Device state manager (152) may maintain and use network information repository (162) to make a determination regarding whether devices for which device state manager (152) provides state management services should be quarantined.

Network information repository (162) may be implemented as, for example, a table. Each row in the table may correspond to information obtained from a particular network device. The elements of each row may include information reflecting the information obtained from the particular network device.

Network state repository (164) may be implemented using one or more data structures. The data structures may include information reflecting the states of the devices for which device state manager (152) provides state management services.

Network state repository (164) may be implemented as, for example, a table. Each row in the table may correspond to states of respective devices for which device state manager (152) provides state management services. The elements of each row may include information reflecting the state of the corresponding device.

As used above with respect to storage (154), maintain means to update (e.g., modify, delete, and/or add information) the aforementioned data structures in accordance with changes made to the information upon which the data structures are based. Updating may occur continuously, periodically, at scheduled points in time, responsively to changes, or in other manners. Consequently, the aforementioned data structures may not reflect the information upon which the data structures are based at all points in time.

While the data structures stored in storage (154) have been described as including a limited amount of specific information, any of the data structures stored in storage (154) may include additional, less, and/or different information without departing from the embodiments disclosed herein. Further, the aforementioned data structures may be combined, subdivided into any number of data structures, may be stored in other locations (e.g., in a storage hosted by another device), and/or spanned across any number of devices without departing from the embodiments disclosed herein. Additionally, while described as being implemented using tables, the data structures stored in storage (154) may be implemented using other types of data structures such as, for example, lists, linked lists, databases, text files, and/or other types of data structures.

Additionally, while example network manager (150) has been illustrated as including a limited number of specific components, example network manager (150) may include fewer, different, and/or additional components without departing from embodiments disclosed herein.

As discussed above, the system of FIG. 1.1 may manage device states including quarantine states. FIGS. 2.1-3.2 show diagrams of methods that may be performed by components of the system of FIG. 1.1 in accordance with one or more embodiment disclosed herein when managing the states of devices of network (10) (and/or other devices).

FIG. 2.1 shows a flowchart describing a method for managing device states in accordance with one or more embodiments disclosed herein. The method may be performed by, for example, a device state manager (e.g., 152, FIG. 1.3) of a network manager. Other entities may perform all, or a portion, of the method of FIG. 2.1 without departing from embodiments disclosed herein.

While the various steps in the flowchart shown in FIG. 2.1 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel or partially overlapping in time manner.

In step 200, a signature of a device is obtained. The signature may be based on information obtained from any number of devices (e.g., network devices (15), FIG. 1.1). The obtained information may be used to obtain the signature.

The signature may be a data structure that indicates whether a particular device should be quarantined. For example, the signature may indicate whether the device is compromised, is contributing to a compromise of the network topology, or otherwise operating in an undesired manner that may impact a network environment in which the device resides.

The signature may indicate, for example, whether the device is transmitting network data units that are negatively impacting the network environment. When a network device is compromised, the network devices may transmit network data units to one or more devices that negatively impact the devices.

In another example, the signature may indicate, for example, that the device is receiving harmful network data units that are negatively impacting the network environment. When a device (e.g., a network device) is receiving harmful network data units, the network devices may transmit (e.g., forward) the harmful network data units to one or more devices that negatively impact the devices.

As used herein, a harmful network data unit may be one that is unexpected by a network topology. For example, a network topology may include any number of network devices that provide services to clients. The clients (e.g., personal electronic devices, laptops, desktops, etc.) may be compromised resulting in the clients transmitting network data units that are, for example, malformed, malicious, not useful, or otherwise do not conform to an expected or planned for operation of the network topology.

In one or more embodiments of the invention, a devices operates in an undesired manner when it operates in a manner that is unexpected. For example, a device may operate in an undesired manner when it diverges from a common standard of operation. In another example, a device may operate in an undesired manner when a management entity determines that a system would operate in a more desirable manner if the device was quarantined.

The signature may be obtained by, for example, aggregating the information regarding the network device obtained from any number of devices. The aggregated information may provide a multi-device view of the network data unit transmission services provided by the device and/or other activity by the device. The multi-device view may be used to ascertain whether the device (if possible) should be quarantined (and/or a network device operably connected to the device) and/or provide information regarding the behavior of the device that indicates that it should be quarantined.

For example, consider a scenario where information from three devices is obtained. The information may reflect network data units transmitted by a suspect device to each of the three devices. The information may be aggregated to obtain a signature of the network data unit transmission behavior of the device. The signature may indicate that, for example, the suspect device is transmitting malformed/malicious/otherwise disadvantageous network data units to one, two, none, or all three of the devices from which information is obtained. The signature may include additional and/or different types of information (e.g., information obtained from the suspect device such as the results of a security analysis of the suspect network device).

In step 202, it is determined whether the signature indicates that a quarantine should be implemented. The determination may be based on an analysis of the signature obtained in step 200. The analysis may include, for example, determining if any portion of the signature indicates that the network device is compromised or otherwise operating in a manner inconsistent with a predetermined manner of operation (e.g., desirable operation). The analysis may be performed in any manner without departing from embodiments disclosed herein. The result of the analysis may indicate whether the quarantine should be implemented.

For example, the scenario as described with respect to step 200 where a signature includes information obtained from three devices. In such a scenario, the analysis may include determining whether any of the devices have received malformed network data units from the suspect device. If any of the devices have received malformed network data units, it may be determined that a quarantine should be implemented and that the cause (i.e., the basis for the quarantine) of the quarantine is that the suspect device transmitted malformed network data units to a device.

If it is determined that a quarantine should be implemented, the method may proceed to step 204. If it is determined that a quarantine should not be implemented, the method may end following step 202.

As will be discussed in greater detail below, if the suspect device is a client, the quarantine may include stopping network devices from receiving network data units from the client. For example, one or more network devices operably connected to the suspect device may close their respective ports that operably connect the network devices to the suspect device. Alternatively, if the suspect device is a network data unit, the quarantine may include causing the network device to stop transmitting network data units out of one or more of its ports. The quarantine may be implemented via other methods without departing from embodiments disclosed herein In step 204, a quarantine state update is obtained. The quarantine state update may indicate that the device is quarantined. The quarantine state update may also specify a basis upon which the decision to quarantine the network device was made (e.g., that the network device transmitted a network data unit to another device indicating that the network device should be quarantined, that the result of a security analysis of the network device indicates that the network device should be quarantined, etc.).

The quarantine state update may be implemented as, for example, a data structure. The data structure may specify (i) the current quarantine state of the network device, (ii) the basis for quarantining (if the current state is a quarantine state) the network device, and/or (iii) other information that may be relevant for quarantining the network device. The other information may include, for example, a duration of the quarantine, a point in time that the quarantine will end, etc. After expiration of the quarantine, the operation of a device may automatically revert to that consistent with a non-quarantined state. For example, ports may be turned back on to receive/transmit network data units, services suspended during quarantine may again be offered, etc.

The quarantine state update may be obtained by generating it. For example, the quarantine state update may be dynamically generated in response to the determination made in step 202. The quarantine state update may be obtained using other methods without departing from embodiments disclosed herein. For example, the quarantine state update may be obtained by retrieving it from a database/other type of data structure or be obtained from another entity (e.g., another network manager).

In step 206, the quarantine is enforced on the device.

The quarantine state may be enforced using the quarantine state update. To enforce the quarantine state using the quarantine state update, the quarantine state update may be provided to the device and/or a network device operably connected to the device. Once provided, the entity enforcing the quarantine may assume that the quarantine is implemented without verifying that any activities have been performed by other entities (e.g., those that received the quarantine state update) to implement the quarantine state update. For example, the entity enforcing the quarantine (and/or other entities in the system) may not actively monitor the behavior of the device, network device connected to the device, or other devices to ascertain whether the quarantine is implemented.

Enforcing the quarantine on the device may not include indicating, to the network device, how the network device implements the quarantine. Rather, the enforcing entity (and/or other entities in the system) may assume that devices receiving the quarantine state update will perform methods for implementing the quarantine state that are unknown to the enforcing entity. In other words, the enforcing entity may not know the actions that will be performed by the devices to implement the quarantine.

In one or more embodiments disclosed herein, the quarantine is enforced using the method illustrated in FIG. 2.2. The quarantine may be enforced using other methods without departing from embodiments disclosed herein.

The method may end following step 206.

Using the method illustrated in FIG. 2.1, quarantines may be enforced on any number of devices. By utilizing the method illustrated in FIG. 2.1, the computational cost for enforcing quarantines may be reduced by (i) not specifying how quarantines are implemented and (ii) assuming that the quarantines are implemented. By doing so, a system in accordance with embodiments disclosed herein may be scalable for enforcing quarantines on larger numbers of devices by reducing the cost for enforcing quarantines. For additional details regarding how quarantines may be enforced, refer to FIG. 2.2.

FIG. 2.2 shows a flowchart describing a method for enforcing quarantines in accordance with one or more embodiments disclosed herein. The method may be performed by, for example, a device state manager (e.g., 152, FIG. 1.3) of a network manager. Other entities may perform all, or a portion, of the method of FIG. 2.2 without departing from embodiments disclosed herein.

While the various steps in the flowchart shown in FIG. 2.2 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel or partially overlapping in time manner.

In step 210, the quarantine state update of step 204 of FIG. 2.1 is provided to a device discussed with respect to FIG. 2.1. The device may be a client, a network device, or another device. For example, the quarantine state update may be provided to a network device that is operably connected to a client that is suspected of being compromised or otherwise acting in an undesired manner with respect to use of services provided by the network topology.

The quarantine state update may be provided to the device by transmitting a copy of the quarantine state update to the device using one or more messages. The quarantine state update may be provided to the device using other methods without departing from embodiments disclosed herein. For example, a publish-subscription based system for information transmission may be used, the quarantine state update may be stored in a predetermined location through which the device may retrieve it, etc.

In step 212, it is assumed that the device implements the quarantine state update after being provided the quarantine state update. In other words, once the quarantine state update is provided to the device, the enforcing entity may not take any other action to enforce the quarantine. Rather, the enforcing entity may assume that the device performs actions, conforms its behavior, or otherwise implements the state specified by the quarantine state update.

For example, the enforcing entity may assume that the device implements a state based management system which will cause the quarantine state specified by the quarantine state update to be implemented by the device. Consequently, the enforcing entity may not (i) identify actions performed by the device to implement the quarantine state, (ii) check the device to determine if it performed a particular action to implement the quarantine state, and/or (iii) otherwise communicate with the device or other devices to ascertain whether the device is operating in accordance with the quarantine state.

In some embodiments disclosed herein, the enforcing entity may communicate with the device to obtain its quarantine state entry to verify whether the device has updated its data structure used to represent it quarantine state, without identifying actions being performed by the device to comply with its quarantine state.

The method may end following step 212.

Using the method illustrated in FIG. 2.2, a system in accordance with embodiments disclosed herein may implement quarantines based on a state management system. The state management system implemented by devices of the system may automatically conform their behavior to the states specified by the system. Consequently, management overhead (e.g., verifying steps to implement quarantines have been performed) for enforcing quarantines may be reduced.

In addition to actions performed by network managers to enforce quarantines, network devices (and/or other devices of a system) may perform actions to enforce quarantines. FIGS. 3.1-3.2 illustrate methods that may be performed by network devices and/or other devices to enforce quarantines.

FIG. 3.1 shows a flowchart describing a method for enforcing quarantines in accordance with one or more embodiments disclosed herein. The method may be performed by, for example, network devices (e.g., 100, FIG. 1.2) of a network. Other entities may perform all, or a portion, of the method of FIG. 3.1 without departing from embodiments disclosed herein.

While the various steps in the flowchart shown in FIG. 3.1 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel or partially overlapping in time manner.

In step 300, a quarantine state update for a device is obtained. The quarantine state update may be obtained by, for example, receiving the quarantine state update from a network manager or an intermediary (e.g., a device assisting the network manager in providing the quarantine state update to the network device) that provides state management services to the device. The quarantine state update may be obtained via other methods without departing from embodiments disclosed herein.

In step 302, it is determined whether the quarantine state update indicates a quarantine state change to a quarantined state. The quarantine state update may specify a quarantine state for the device. The determination may be made by comparing the quarantine state specified by the update to a quarantine state maintained by the device (e.g., a portion of a state repository). If the specified quarantine state indicates that the device is quarantined and the maintained quarantine state indicates that the device is not quarantined, the device may determine that its quarantine state has changed to a quarantined state.

If the device determines that its quarantine state has changed to quarantined, the method may proceed to step 304. If the device determines that its quarantine state has not changed, the method may end following step 302.

Step 302 may be performed by the device in accordance with a state management system. The state management system implemented by the device may manage the device in accordance with (i) its workloads being performed, (ii) availability of limited computing resources, and/or (iii) other criteria. Consequently, when the quarantine state update is obtained in step 300, some amount of time may elapse before step 302 is performed, even though the determination may be performed in response to obtaining the quarantine state update.

Additionally, the device may update its maintained state based on the state specified by the quarantine state update. For example, the device may update its state repository, particularly its quarantine state specified by the state repository, to reflect the quarantine state specified by the quarantine state update. The determination of step 302 may be made as part of updating its state repository.

In step 304, the device is transitioned to the quarantine state. The device may be transitioned to the quarantine state by updating its state repository, as discussed above. Because the device may implement a state based management system, modifying the state repository may cause the device to modify its operation based on the states specified in the state repository, including its quarantine state.

In step 306, an action set associated with the quarantined state is obtained. The action set may be tailored to characteristics of the device. For example, the action set may be based on the physical and/or logical components of the device, the connectivity between the device and/or other devices, etc.

Additionally, the action set may be based, at least in part, on a basis for which the decision to quarantine the device is made. As noted with respect to FIGS. 2.1-2.2, the quarantine state update may specify the basis upon which the decision to quarantine the device was made. The aforementioned information may be used to, for example, customize a generalized action set to be performed when in a quarantined state.

For example, consider a scenario where the device maintains a repository of generalized action sets. Each of the action sets may be keyed to information included in potentially obtainable quarantine state updates. The generalized action sets may include place holders into which additional information, specified by the quarantine state update, may be added to customize the action set to the particular basis upon which the decision to quarantine the device was made.

A generalized action set may specify, for example, that one or more of the egress ports are to be shut down (e.g., no network data units allowed to be transmitted out of the shutdown egress ports), that one or more of the ingress ports are to be shut down (e.g., no network data units allowed to be received via the shut down ingress ports), that the forwarding information used by the device to forward network data units is to be modified, etc.

The generalized action set may also include place holders for devices corresponding to the ingress/egress ports. If the basis upon which the quarantine decision was made indicates that only some of the devices corresponding to the egress ports have obtained or are sending undesired network data units to/from the device, then only those actions necessary to shut down the ingress/egress ports associated with those devices may be included in the customized action set. Generalized action sets may be modified to obtain customized action set using other methods (e.g., may add, modify, remove actions based on other types of information included in quarantine state updates and/or other data structures) without departing from embodiments disclosed herein.

In step 308, the action set is performed to quarantine the network device. The action set may be customized, as discussed above. The action set may be unknown to the entity enforcing the quarantine on the network device.

The action set may be performed using the method illustrated in FIG. 3.2. Other methods may be used to perform the action set without departing from embodiments disclosed herein.

The method may end following step 308.

Using the method illustrated in FIG. 3.1, a system in accordance with embodiments disclosed herein may enforce quarantines on devices with limited overhead on the system. Consequently, a system in accordance with embodiments disclosed herein may have more available computing resources for providing network data unit transmission services. For additional details regarding actions performed to enforce quarantines, refer to FIG. 3.2.

FIG. 3.2 shows a flowchart describing a method for enforcing quarantines in accordance with one or more embodiments disclosed herein. The method may be performed by, for example, network devices (e.g., 100, FIG. 1.2) of a network. Other entities may perform all, or a portion, of the method of FIG. 3.2 without departing from embodiments disclosed herein.

While the various steps in the flowchart shown in FIG. 3.2 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel or partially overlapping in time manner.

In step 310, network data unit transmission services provided by the device are suspended. The network data unit transmission services may be suspended by, for example, shutting down one or more ingress and/or egress ports of the device, screening network data units having predetermined characteristics (e.g., destinations, encapsulation types, etc.), terminating one or more applications hosted by the device, etc.

The network data unit transmission services provided by the device may be partially suspended rather than completely suspended (e.g., no network data units transmitted by the network device, network data units received from one of many other connected devices dropped, etc.). In other words, the network device may selectively provide network data unit transmission services while the network data unit transmission services are suspended.

In step 312, quarantined state corrective activity logging for the device is initiated. Quarantined state corrective activity logging may include generating a log of actions performed by the device while in the quarantined state. Logging the quarantined state corrective activity may include monitoring actions performed by the device while in the quarantined state and storing the monitored actions (or information derived from the monitoring) in a repository.

In step 314, at least one action performed by the device used as a basis for quarantining the network device is identified. As noted above with respect to FIG. 3.1, the quarantine state update may specify any number of actions performed by the device that may be used as the basis for quarantining the network device. Any of those specified actions may be used as the at least one action. For example, transmission or reception of one or more network data units indicative of undesired activity may be used as the basis for a quarantine.

In step 316, at least one quarantined state corrective action is performed based on the identified at least one action. The quarantined state corrective action may be an action designed to prevent, remediate, or otherwise address the at least one action that lead to the quarantine. By doing so, the device may be less likely to perform actions that may cause management entities to determine that the network device should be quarantined.

For example, the quarantined state corrective action may be to suspend execution of an application hosted by the network device.

In another example, the quarantined state corrective action may be to modify the network data unit forwarding behavior of the network device.

In a still further example, the quarantined state corrective action may be to close an egress port.

In yet another example, the quarantined state corrective action may be to close an ingress port.

In an additional example, the quarantined state corrective action may be to perform diagnostic analysis (e.g., the logging of step 312 or other type of action that obtains information that may be helpful in quarantining/addressing the quarantine of the network device) of the device or another operably connected device and provide the results of the diagnostic analysis to another device (e.g., a management entity).

In a further example, the quarantined state corrective action may be to notify an administrator of the network device that the network device is in the quarantine state.

The quarantined state corrective action may be other types of actions without departing from embodiments disclosed herein.

The network device may perform any number and type of quarantined state corrective actions.

The method may end following step 316.

Using the method illustrated in FIG. 3.2, a system in accordance with embodiments disclosed herein may cooperatively implement and/or address device quarantines. Consequently, operation of devices that negatively impact a network environment may be modified to reduce the impact of the devices on the network environment.

As discussed above, embodiments disclosed herein may be implemented using a network device. In one or more embodiments, a network device is implemented as a physical device that includes and/or is operatively connected to persistent storage (not shown), memory (e.g., random access memory (RAM)) (not shown), one or more processor(s) (e.g., integrated circuits) (not shown), and at least one physical network interface (not shown), which may also be referred to as a port. Examples of a network device (e.g., 15, FIG. 1.1) include, but are not limited to, a network switch, a router, a multilayer switch, a fiber channel device, an InfiniBand® device, etc. A network device (e.g., 15, FIG. 1.1) is not limited to the aforementioned specific examples.

In one or more embodiments, a network device (e.g., 15, FIG. 1.1) includes functionality to receive network data units (e.g., frames, packets, tunneling protocol frames, etc.) at any of the physical network interfaces (i.e., ports) of the network device (e.g., 15, FIG. 1.1) and to process the network traffic data units. In one or more embodiments, processing a network traffic data unit includes, but is not limited to, a series of one or more table lookups (e.g., longest prefix match (LPM) lookups, forwarding information lookups, etc.) and corresponding actions (e.g., forward from a certain egress port, add a labeling protocol header, rewrite a destination address, encapsulate, etc.). Such a series of lookups and corresponding actions may be referred to as a pipeline, and may, for example, be programmed as a match-action pipeline using the P4 programming language. Examples of pipeline processing include, but are not limited to, performing a lookup to determine: (i) whether to take a security action (e.g., drop the network traffic data unit); (ii) whether to mirror the network traffic data unit; and/or (iii) determine how to route/forward the network traffic data unit in order to transmit the network traffic data unit from an interface of the network device (e.g., 15, FIG. 1.1).

In one or more embodiments, a network device (e.g., 15, FIG. 1.1) also includes and/or is operatively connected to device persistent storage and/or device memory (i.e., non-transitory computer readable mediums used to provide persistent storage resources and/or memory resources) storing software and/or firmware.

Such software and/or firmware may include instructions which, when executed by the one or more processors of a network device (e.g., 15, FIG. 1.1), cause the one or more processors to perform operations in accordance with one or more embodiments described herein.

The software instructions may be in the form of computer readable program code to perform embodiments described herein, and may be stored, in whole or in part, temporarily or permanently, on a non-transitory computer readable medium such as a CD, DVD, storage device, a diskette, a tape, flash memory, physical memory, or any other non-transitory computer readable medium.

In one or more embodiments, the network device (e.g., 15, FIG. 1.1) is part of a network (e.g., 10, FIG. 1.1). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments, a network includes a collection of one or more network devices (e.g., network device (e.g., 15, FIG. 1.1)) that facilitate network connectivity for one or more operatively connected devices (e.g., computing devices, data storage devices, other network devices, etc.). In one or more embodiments, the network device (e.g., 15, FIG. 1.1) and other devices within the network (not shown) are arranged in a network topology (not shown). In one or more embodiments, a network topology is an arrangement of various elements of a network.

In one or more embodiments, a computing device is any device or any set of devices capable of electronically processing instructions and may include, but is not limited to, any of the following: one or more processors (not shown), memory (e.g., random access memory (RAM)) (not shown), input and output device(s) (not shown), persistent storage (not shown), one or more physical interfaces (e.g., network ports) (not shown), any number of other hardware components (not shown) or any combination thereof. Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.) such as that described above and below, a virtual machine, and/or any other type of computing device with the aforementioned requirements.

To further clarify embodiments disclosed herein, a non-limiting example is provided in FIGS. 4.1-4.7. FIG. 4.1-4.7 may illustrate a system similar to that illustrated in FIG. 1.1 over a period of time. For the sake of brevity, only a limited number of components of the system of FIG. 1.1 are illustrated in each of FIGS. 4.1-4.7.

Example

Consider a scenario as illustrated in FIG. 4.1 in which a network manager (400) is providing state management services to two network devices (e.g., 406, 408). The network devices (e.g., 406, 408) and network manager (400) are connected to each other through physical connections illustrated using lines terminating in arrows. For example, first network device (406) is directly connected to second network device (408). The network devices provide services to two clients (e.g., 402, 404).

In FIGS. 4.2-4.7, the physical connectivity between these devices will change. To indicate changes in connectivity, lines ending in arrows indicate physical connectivity between devices. Lines terminating in arrows at each end indicate bi-directional connectivity. In contrast, lines terminating in a single arrow indicate that network data units only flow in a single direction (i.e., to the device which the arrow is pointing). Additionally, dashed lines indicate the flow of a particular set of network data units, for example, in FIG. 4.2, a dashed line extending from first client (402) and terminating in an arrow directed towards first network device (406) indicates transmission of network data units from first client (402) to first network device (406).

At a first point in time illustrated in FIG. 4.2, first client (402) is compromised by a malicious attacker. The malicious attacked installs software which causes first client (402) to begin transmitting malicious network data units (410) to first network device (406). The malicious network data units (410) negatively impact the operation of the system of FIG. 4.2.

In response to receiving the malicious network data units (410), first network device (406) generates a traffic sample (420) and provides it to network manager (400) as illustrated in FIG. 4.3. The traffic sample (420) indicates that first client (402) is sending network data units to first network device (406) that are negatively impacting the operation of the network.

In response to receiving the traffic sample (420), network manager (400) determines that first network device (406) should be quarantined to isolate first client (402) from first network device (406). Based on the determination, network manager (400) generates quarantine state update (430), and provides quarantine state update (430) to first network device (406) as illustrated in FIG. 4.4. Quarantine state update (430) specifies that the quarantine state of first network device (406) is quarantined and that the cause of the quarantine is receipt of the malicious network data units via the port that connects first network device (406) to first client (402).

However, as illustrated in FIG. 4.5, first network device (406) takes some time to process quarantine state update (430) resulting in second malicious network data units (440) continuing to be transmitted to first network device (406).

After the second malicious network data units (440) are received, first network device (406) updates its state as quarantined as illustrated in FIG. 4.6.

Based on its change in quarantine state, first network device (406) modifies its operation including performing an action set. The action set includes modifying the connectivity between first network device (406) and first client (402).

Turning to FIG. 4.7, the connectivity between first network device (406) and first client (402) is modified to prevent network data units from being transmitted from first client (402) to first network device (406). To make this change in connectivity, first network device (406) shut off its port through which it receives network data units from first client (402). Consequently, first client (402) is unable to send malicious network data units to first network device (406).

At the point in time illustrated in FIG. 4.7, a network administrator may be notified of the quarantine of first network device (406). The network administrator may then identify and fix the compromised state of the network without first client (402) continuing to negatively impact the system of FIG. 4.7 until the network administrator fixes first client (402).

End of Example

By implementing a system similar to that illustrated in FIGS. 4.1-4.7, devices of the system may be quarantined in a computationally efficient manner. By sending quarantine state updates which cause the quarantine state of a receiving device to change, management entities may be freed from needing to actively manage the receiving device. After the state of the receiving device is updated, the receiving device may manage its operation based on the state change. Consequently, resets of the device or other unexpected changes in the operation of the device may not require management entities to monitor and potentially intervene to ensure that the receiving devices operate in a manner consistent with being quarantined. Consequently, the overhead required for quarantining devices may be reduced.

As discussed above, embodiments disclosed herein may be implemented using computing devices. FIG. 5 shows a diagram of a computing device in accordance with one or more embodiments disclosed herein. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment disclosed herein, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment disclosed herein, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments disclosed herein may provide systems, devices, and methods that enable devices to be quarantined. To do so, quarantines may be enforced using state management systems employed by devices that are subject to being quarantined. Rather than specifying actions to be taken when a management entity determines that a device is to be quarantined, the management entity may merely specify that a quarantine state of a device is quarantined. The state management system of the quarantined device may automatically take action based on its quarantine state. Consequently, the overhead for enforcing quarantines on devices may be greatly reduced.

For example, management entities may not need to (i) identify actions to be performed by a device to be quarantined, (ii) verify that the device has performed actions to quarantine itself, and/or (iii) verify that the device has been effectively quarantined. Rather, by representing whether a device is quarantined as a state of the device, the number of actions necessary to be performed by management entities to quarantine a device may be reduced.

Thus, embodiments disclosed herein may address the problem of limited computational resources in a system. By reducing the overhead required for quarantining devices, embodiments disclosed herein may enable a network to provide improved services (e.g., network data unit transmission services) by reducing the quantity of resources required to enforce quarantines.

Specific embodiments described above have referenced the accompanying figures. In the above description, numerous details were set forth as examples. It will be understood by those skilled in the art, and having the benefit of this document, that one or more embodiments described herein may be practiced without these specific details and that numerous variations or modifications may be possible without departing from the scope of the embodiments. Certain details known to those of ordinary skill in the art have been omitted to avoid obscuring the description.

In the above description of the figures, any component described with regard to a figure, in various embodiments, may be equivalent to one or more like-named components shown and/or described with regard to any other figure. For brevity, descriptions of these components may not have been repeated with regard to each figure. Thus, each and every embodiment of the components of each figure has been incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may have been used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, operably connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having benefit of this disclosure, will appreciate that other embodiments can be devised which do not depart from the scope of embodiments disclosed herein. Accordingly, the scope of embodiments described herein should be limited only by the attached claims.

What is claimed is:

1. A method for managing a network topology comprising network devices that provide network data unit transmission services based on respective quarantine states of the network devices and a network manager that manages the quarantine states, comprising:
   obtaining, by the network manager, a signature of a network device that participates in the network topology, the signature indicating that the network device is operating in an undesired manner;
   making a determination, by the network manager and based on signature, that the network device should be in a quarantined state;
   in response to making the determination:
      generating, by the network manager, a quarantine state update that indicates that the network device is in the quarantined state; and
      sending, by the network manager, the quarantine state update to the network device of the network devices wherein the quarantine state update causes the network device to perform a first action set that is specific to the network device and modifies operation of the network device to conform to the quarantined state, the network manager taking no other action to enforce the quarantined state, the other action including at least two of: identifying actions performed by the network device to implement the quarantine state; checking the network device to determine if the network device performed a particular action to implement the quarantine state; and communicating with the network device or other devices to ascertain whether the network device is operating in accordance with the quarantine state.

2. The method of claim 1, further comprising:
   sending, by the network manager and in response to the determination, a second quarantine state update to a second network device, wherein the second quarantine state update does not indicate how the second network device implements the quarantined state, wherein the second quarantine state update causes the second network device to perform a second action set to modify operation of a second device to conform to the quarantined state.

3. The method of claim 2, wherein the second action set comprises at least one action not included in the first action set.

4. The method of claim 1, wherein after sending the quarantine state update to the network device, the network manager operates as if that the network device implemented the quarantine state without verifying that the quarantine state is implemented by the network device.

5. The method of claim 1, wherein the quarantine state update specifies a point in time at which a quarantine of the network device will end.

6. The method of claim 1, wherein the quarantine state update specifies that the network device is transmitting harmful network data units to a second network device.

7. The method of claim 6, wherein the quarantine state update causes the network device to shut off a port through which the network device receives the harmful network data units.

8. A non-transitory computer readable medium comprising computer readable program code, which when executed by a computer processor enables the computer processor to perform a method for managing a network topology comprising network devices that provide network data unit transmission services based on respective quarantine states of the network devices and a network manager that manages the quarantine states, the method comprising:

obtaining, by the network manager, a signature of a network device that participates in the network topology, the signature indicating that the network device is operating in an undesired manner;

making a determination, by the network manager and based on signature, that the network device should be in a quarantined state;

in response to making the determination:

generating, by the network manager, a quarantine state update that indicates that the network device is in the quarantined state; and sending, by the network manager, the quarantine state update to the network device of the network devices wherein the quarantine state update causes the network device to perform a first action set that is specific to the network device and modifies operation of the network device to conform to the quarantined state, the network manager taking no other action to enforce the quarantined state, the other action including at least two of: identifying actions performed by the network device to implement the quarantine state; checking the network device to determine if the network device performed a particular action to implement the quarantine state; and communicating with the network device or other devices to ascertain whether the network device is operating in accordance with the quarantine state.

9. The non-transitory computer readable medium of claim 8, wherein the method further comprises:

sending, by the network manager and in response to the determination, a second quarantine state update to a second network device, wherein the second quarantine state update does not indicate how the second network device implements the quarantined state, wherein the second quarantine state update causes the second network device to perform a second action set that is specific to the second network device and modifies operation of a device to conform to the quarantined state.

10. The non-transitory computer readable medium of claim 9, wherein the second action set comprises at least one action not included in the first action set.

11. The non-transitory computer readable medium of claim 9, wherein after sending the quarantine state update to the network device, the network manager operates as-if the network device implemented the quarantine state without verifying that the quarantine state is implemented by the network device.

12. The non-transitory computer readable medium of claim 8, wherein the quarantine state update specifies a point in time at which a quarantine of the network device will end.

13. The non-transitory computer readable medium of claim 8, wherein the quarantine state update specifies that the network device transmitting harmful network data units to the network device.

14. The non-transitory computer readable medium of claim 13, wherein the quarantine state update causes the network device to shut off a port through which the network device receives the harmful network data units.

15. A network manager of a network topology, comprising:

memory for storing a signature of a network device in the network topology; and a device state manager programmed to:

obtain the signature of the network device, the signature indicating that the network device is operating in an undesired manner;

make a determination, based on signature, that the network device should be in a quarantined state;

in response to making the determination:

generate a quarantine state update that indicates that the network device is in the quarantined state; and send the quarantine state update to the network device of the network topology wherein the quarantine state update causes the network device to perform a first action set that is specific to the network device and modifies operation of the network device to conform to the quarantined state, wherein the network manager takes no other action to enforce the quarantined state, the other action including at least two of: identifying actions performed by the network device to implement the quarantine state; checking the network device to determine if the network device performed a particular action to implement the quarantine state; and communicating with the network device or other devices to ascertain whether the network device is operating in accordance with the quarantine state.

16. The network manager of claim 15, wherein the quarantine state update specifies a point in time at which a quarantine of the network device will end.

17. The network manager of claim 16, wherein the quarantine state update further specifies that the network device transmitting harmful network data units to the network device.

18. The network manager of claim 17, wherein the quarantine state update causes the network device to shut off a port through which the network device receives the harmful network data units.

\* \* \* \* \*